(12) United States Patent
Clyne et al.

(10) Patent No.: US 11,113,972 B2
(45) Date of Patent: Sep. 7, 2021

(54) POSITION DETECTOR AND SYSTEM

(71) Applicant: Precision Triathlon Systems Limited, Christchurch (NZ)

(72) Inventors: Marcus Neary Clyne, Christchurch (NZ); James Colin Elvery, Auckland (NZ); Dylan Charles McNeice, Christchurch (NZ)

(73) Assignee: Precision Triatholon Systems Limited, Christchurch (NZ)

( * ) Notice: Subject to any disclaimer, the term of this patent is extended or adjusted under 35 U.S.C. 154(b) by 0 days.

(21) Appl. No.: 16/393,791

(22) Filed: Apr. 24, 2019

(65) Prior Publication Data

US 2019/0311626 A1  Oct. 10, 2019

Related U.S. Application Data

(63) Continuation of application No. 16/376,472, filed on Apr. 5, 2019, now abandoned.

(30) Foreign Application Priority Data

Apr. 6, 2018 (NZ) .......................................... 741403

(51) Int. Cl.
*G08G 1/16* (2006.01)
*A63K 3/00* (2006.01)
(Continued)

(52) U.S. Cl.
CPC .............. *G08G 1/166* (2013.01); *A63K 3/00* (2013.01); *B60Q 9/00* (2013.01); *B62J 45/40* (2020.02); *B62J 99/00* (2013.01)

(58) Field of Classification Search
CPC .... A63K 3/00; B60Q 9/00; B62J 45/40; B62J 50/25; B62J 6/04; B62J 99/00; G08G 1/166
See application file for complete search history.

(56) References Cited

U.S. PATENT DOCUMENTS

| 3,442,347 A | 5/1969 | Freson |
| 3,898,652 A | 8/1975 | Rashid |
| (Continued) | | |

FOREIGN PATENT DOCUMENTS

| CN | 104527857 A | 4/2015 |
| CN | 107399389 A | 11/2017 |
| (Continued) | | |

OTHER PUBLICATIONS

Radical Idea to Stop Draft Packs: Triathlon Forum: Slowtwitch Forums—https://forum.slowtwitch.com/forum/Slowtwitch_Forums_C1/Triathlon_Forum_F1/Radical_Idea_to_Stop_Draft_Packs_P1565205/? (Nov. 12, 2007).

(Continued)

*Primary Examiner* — Thomas S McCormack
(74) *Attorney, Agent, or Firm* — Merchant & Gould P.C.

(57) ABSTRACT

A proximity monitor for monitoring a zone associated with a vehicle, such as during a race. In a race each vehicle may have a proximity monitor to enable monitoring of distances between proximate vehicles. Each proximity monitor may include an RF transmitter and an RF receiver to communicate with proximate monitors and use signal timing information to determine spacing between monitors. The monitor may use Ultra Wide Band (UWB) signals to determine spacing and other protocols for communication. The monitor may also detect whether another monitor passes. An alert signal may be generated if the spacing information, and optionally other information, satisfies an alert criterion. A system including such monitors may enable race officials to monitor infringement of rules and enforce penalties in real time on a race course.

14 Claims, 18 Drawing Sheets

(51) Int. Cl.
   *B60Q 9/00*   (2006.01)
   *B62J 99/00*   (2020.01)
   *B62J 45/40*   (2020.01)

(56) References Cited

U.S. PATENT DOCUMENTS

| | | |
|---|---|---|
| 4,079,802 A | 3/1978 | Kawata |
| 5,432,509 A | 7/1995 | Kajiwara |
| 5,627,510 A | 5/1997 | Yuan |
| 6,067,031 A | 5/2000 | Janky et al. |
| 6,246,376 B1 | 6/2001 | Bork et al. |
| 6,625,523 B2 | 9/2003 | Campagnolo et al. |
| 6,700,538 B1 | 3/2004 | Richards |
| 6,731,202 B1 | 5/2004 | Klaus |
| 7,057,501 B1 | 6/2006 | Davis |
| 9,381,445 B2 | 7/2016 | Ventura et al. |
| 10,136,253 B1 | 11/2018 | Monteleone et al. |
| 2005/0200487 A1* | 9/2005 | O'Donnell ............. A62B 99/00 340/573.1 |
| 2014/0277637 A1* | 9/2014 | Ventura .................... A63K 3/00 700/91 |
| 2016/0325680 A1* | 11/2016 | Curtis ...................... B60R 1/00 |
| 2016/0363665 A1 | 12/2016 | Carlson et al. |
| 2017/0160392 A1 | 6/2017 | Brisimitzakis et al. |
| 2019/0051183 A1 | 2/2019 | Anderson et al. |

FOREIGN PATENT DOCUMENTS

| | | |
|---|---|---|
| CN | 107651083 A | 2/2018 |
| GB | 2 550 378 A | 11/2017 |
| GB | 2 555 697 A | 5/2018 |
| IN | 201621024080 A | 2/2017 |
| KR | 2014-0028922 A | 3/2014 |
| WO | 2006/012835 A1 | 2/2006 |
| WO | 2014/013176 A2 | 1/2014 |
| WO | 2019/043576 A1 | 3/2019 |

OTHER PUBLICATIONS

ECE Day '09 QuikiTrak's Drafting Zone Detector Part 1—https://youtu.be/8aF9s5N6jCw.

ECE Day '09 QuikiTrak's Drafting Zone Detector Part 2—https://youtu.be/2NE_5ufbJ8E.

* cited by examiner

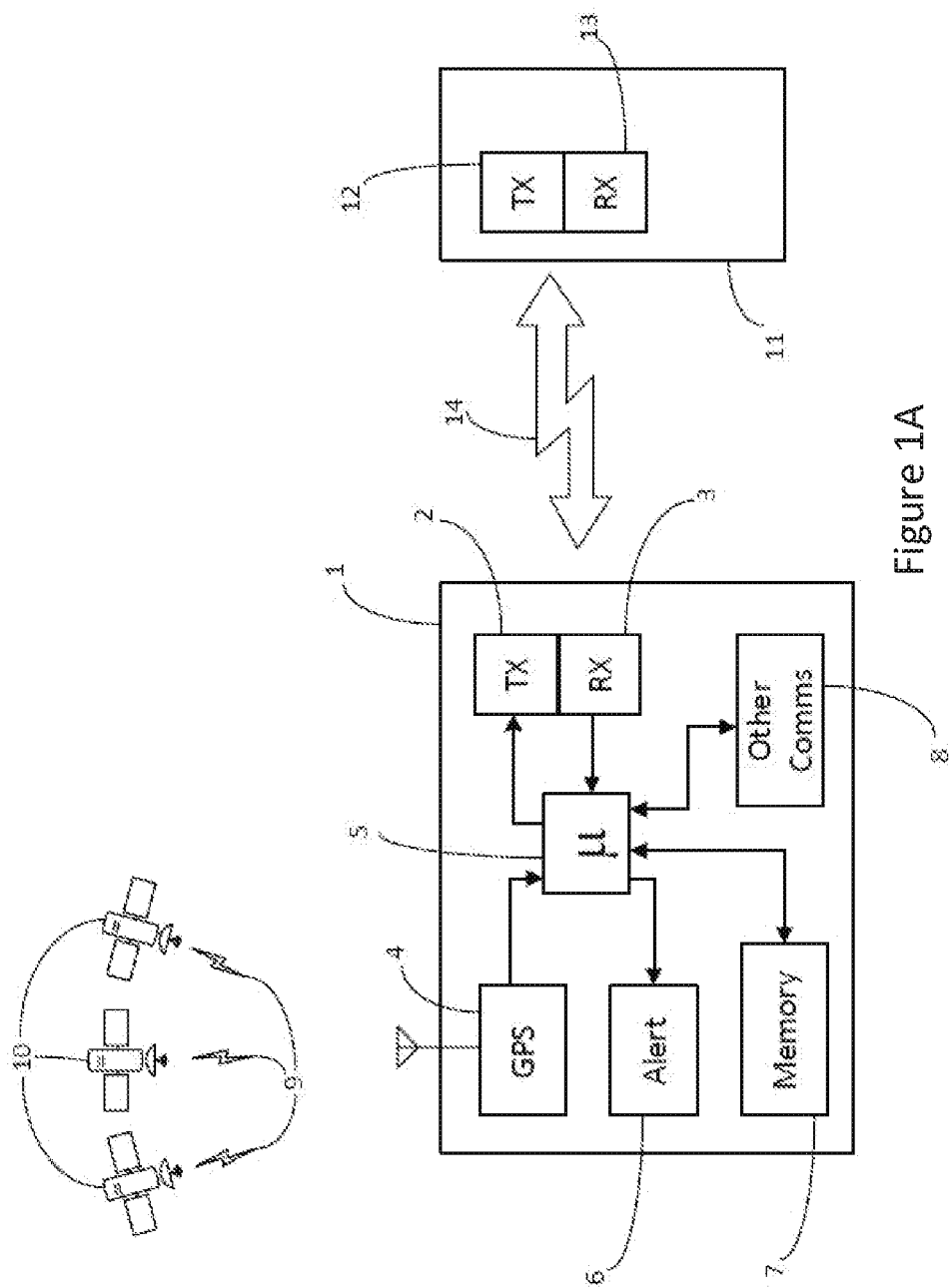

POSITION DETECTOR AND SYSTEM

CROSS REFERENCE TO RELATED CASES

This application is a Continuation of U.S. application Ser. No. 16/376,472, filed 5 Apr. 2019, which claims benefit of Serial No. 741403, filed 6 Apr. 2018 in New Zealand, and which application is incorporated herein by reference. To the extent appropriate, a claim of priority is made to both the above disclosed applications.

TECHNICAL FIELD

The present subject matter relates generally to position monitoring and analysis and more specifically, although not exclusively, to drafting detection devices and penalty notification systems used in cycle races and triathlons.

BACKGROUND

In triathlon or similar multisport races, the cycling stage is treated as an individual time-trial. Riders are not permitted to gain an advantage by slipstreaming or drafting behind other riders. An exception to this is during overtaking; during such overtaking events, both riders will at some point be in a recognised 'drafting zone' in relation to the other rider. There is therefore a time and distance-based rule for overtaking, such that a rider must spend no more than a certain period of time within a certain distance behind another rider. Once overtaken, the now trailing rider must drop back to at least a minimum distance behind the lead rider in a rule specified time period.

If a rider violates such a rule, they accrue a time penalty which must be applied at some point during or after the race. Such rules are difficult to determine visually by race competitors and race referees and are difficult to enforce by race officials because they rely on the naked-eye judgements of competitors and referees in dynamic and often complex situations.

One solution is to use only GPS (or DGPS) to track competitors in real time and apply any penalties at the end of the cycling stage. GPS devices, even DGPS, have accuracy limitations and can lose the satellite signal if not in line of sight. Similarly, communicating GPS positions back to race officials, in order for a central system to detect drafting events, can be affected by loss of cell phone coverage. Consequently, there may be large sections of the race course in which it is difficult to detect drafting accurately, or even impossible to determine if drafting has occurred at all. Using a cell phone for such applications is power-hungry and requires the addition of an external battery to enable tracking during long races.

Another solution uses a bicycle-mounted sonar-based distance sensor to determine the distance to a leading rider, to apply the appropriate rules to any sensed distance, and to warn or inform the trailing rider of any potential or actual violation of those rules. Sonar-based systems may detect unintended objects such as trees and road signs, casing "false positive" rule violation determinations. This system will also struggle if multiple competitors or other moving objects are present within the range of the distance sensor. It is possible that rider #3 is drafting off two riders ahead (#1,#2), while rider #2 is also drafting off rider #1. Rider #3's device needs to also be aware of rider #1's position. If communicating with race officials with a cell phone, loss of signal may cause interruptions in tracking or penalty processing.

None of these solutions are able to accurately determine the moment of pass and are subject to environmental conditions. Some solutions are also open to user tampering to defeat the system.

Some races include referees who are required to apply penalties and cautions and may also be required to ensure that a competitor properly serves the penalty. These may require referees to quickly go to a penalty enforcement area after applying a penalty to ensure it is served, which can be inconvenient and may distract from the task of applying rules. They may also be open to circumvention or otherwise unreliable because a rider may go out of sight of a referee who had been previously monitoring their behavior and may have issued a caution or penalty. Other referees may then be unaware of the rider's past behavior and any cautions or penalties applied to them.

With systems such as these, and others of a similar nature, penalties must be applied at the end of a race stage when the riders are under the control of race officials. This deviates from normal competition and detracts from the spectator experience, in that the competitor order cannot be determined based solely on when they cross the finish line of the cycling stage. Applying penalties at the end of a race stage also detracts from the spectator experience because when a competitor is serving a drafting penalty there is often a lot of negative emotion and this can cause a negative spectacle. This can draw negative attention and detract from the positive image and nature of the event.

It is an object of the invention to provide a drafting detection, monitoring and penalty enforcement system or to at least provide the public with a useful choice.

SUMMARY

According to one example embodiment there is provided a proximity monitor for monitoring a zone associated with a vehicle, the proximity monitor comprising:
  a first radiofrequency (RF) transmitter configured to communicate data with one or more proximate RF receivers of a proximate vehicle in the monitored zone;
  a first RF receiver configured to acquire signal timing information from signals transmitted by one or more proximate RF transmitters of the proximate vehicle;
  a processor configured to:
    generate spacing information as to the spacing between the vehicle and the proximate vehicle;
    generate an alert signal if the spacing information satisfies an alert criterion.

According to another exemplary embodiment there is provided a race communication system comprising:
  a plurality of vehicles, each vehicle including a proximity monitor as set out in the preceding paragraph and a user indicator; and
  one or more remote devices, each including an RF transceiver and a user interface;
  wherein the proximity monitor of each vehicle is configured to:
    transmit a signal to the remote device based on the spacing between the vehicle and a proximate vehicle;
  and wherein the remote device is configured to:
    receive the signal from the vehicle using the RF transceiver,
    present information based on the spacing between the vehicle and the proximate vehicle to a user via the user interface;
    receive an input from the user via the user interface;

generate a penalty signal based on the input from the user; and wherein the penalty signal indicates that a penalty is to be applied to the proximate vehicle or a user thereof.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 1A is a block diagram of a distance measuring device;

DETAILED DESCRIPTION

Figure 1B:
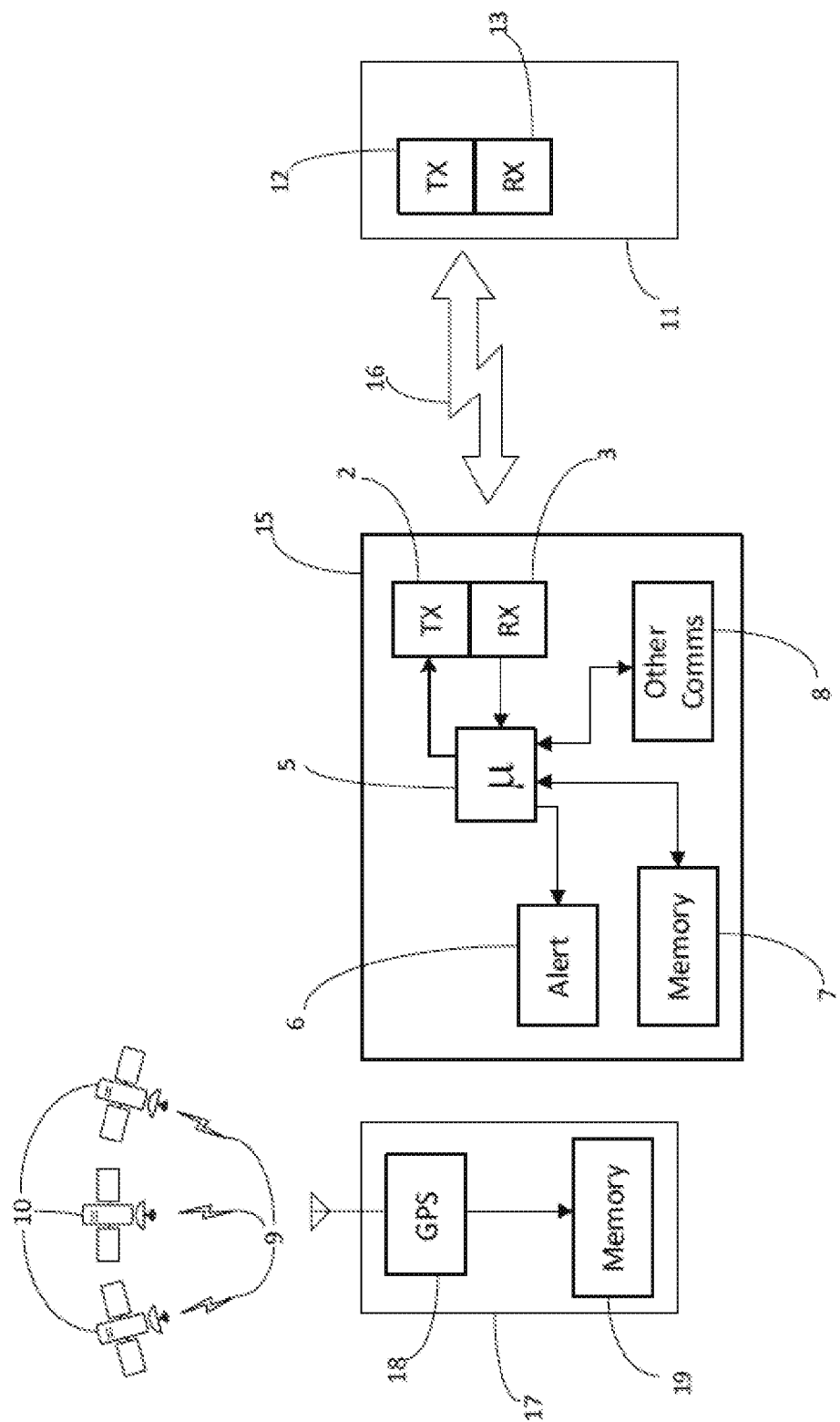
FIG. 1B is a block diagram of a further embodiment of a distance measuring device.

FIG. 1A illustrates a proximity monitor or distance measuring device according to an example embodiment. The proximity monitor 1 includes an RF transmitter 2, an RF receiver 3, a global positioning system (GPS) receiver 4, a microprocessor 5, an alert generator 6, memory 7 and communications module 8. The GPS receiver 4 receives GPS signals 9 from a plurality of GPS satellites 10 and sends the resulting position information to the microprocessor 5. The RF transmitter 2 and receiver 3 can exchange data 14 with a second proximity monitor 11, which includes its own transmitter 12 and receiver 13.

The proximity monitor 1 may be configured to monitor the presence of other devices in a monitored zone. The monitored zone is a zone around the proximity monitor or a vehicle bearing the proximity monitor. In some examples the monitored zone may be towards the rear of the vehicle. In some examples the monitored zone may be defined by a spacing/distance from the vehicle. In some examples, the monitored zone may be defined by an angle to the front-rear axis of the vehicle.

In one typical use the data sent by the proximity monitor 1 includes a unique identification code and the GPS position information determined by the GPS receiver 4. This data is sent to the second device 11 which then sends back its own set of data, and the timing information associated with this data exchange can be used to determine the spacing between the proximity monitor 1 and the other device 11.

If the combination of spacing information (space between monitor 1 and monitor 11 calculated from timing information contained in communications between monitors) and GPS position information satisfies some pre-determined condition or set of conditions, the microprocessor 5 activates the alert module 6. The microprocessor may also store this alert event in memory 7. The alert module can then generate an alert signal. The alert signal can be used to activate an indicator coupled to the proximity monitor or forming part of the proximity monitor. This could, for example, be a visual or audible indicator to indicate an alert to another vehicle or user of another device.

FIG. 1B illustrates a proximity monitor or distance measuring device according to a further example embodiment. The proximity monitor 15 is the same as the proximity monitor 1 except that it does not include the GPS module. However, a GPS module 18 may be provided in a separate unit 17, which includes its own memory 19. Data 16 communicated to the second device 11 now does not include GPS information. The microprocessor 5 now activates the alert module 6 if the spacing between the proximity monitor 15 and the second device 11 satisfies some pre-determined condition or set of conditions.

Any alert events can be stored in memory 7 along with time stamps, and compared at some later time with the GPS record stored in the GPS memory 19, which may be for the purposes of determining event locations, discounting events based on their location, or some other event analysis.

In another example, information such as one or more of the spacing, GPS position and alert status is transmitted to a remote device (discussed later with respect to FIGS. 12A and 12B). The proximity monitor could include a camera and the output of the camera could be transmitted to the remote device. The proximity monitor 1 or 15 can also receive information, such as alert information, from the remote device. This information can be transmitted between the proximity monitor 1 or 15 and the remote device using the RF transmitter and receiver 2, 3 or using one or more other communication modules 8. The information can be transmitted to the remote device continuously, periodically or upon satisfaction of a predetermined condition or set of conditions.

In this example, the remote device or a user thereof can assess the spacing and/or GPS position information. As a result of this assessment, the remote device can transmit a message to the proximity monitor 1 or 15. In response to this message, the proximity monitor 1 or 15 may activate its alert module 6. Alternatively or additionally, the remote device can transmit a message to the second device 11 and in response to this message the second device 11 may activate an associated alert module.

The other communications modules 8 can include a Bluetooth module, a LoRa module, LoRaWAN module, a cellular communication module and/or a Sigfox module. In one example, a Bluetooth module is provided for communicating with similar modules of other cycles via ad hoc mesh networking. The Bluetooth module may be used to transmit information such as GPS location information. In one example, a LoRa module is provided for longer range communications with the remote devices discussed above.

Figure 2:
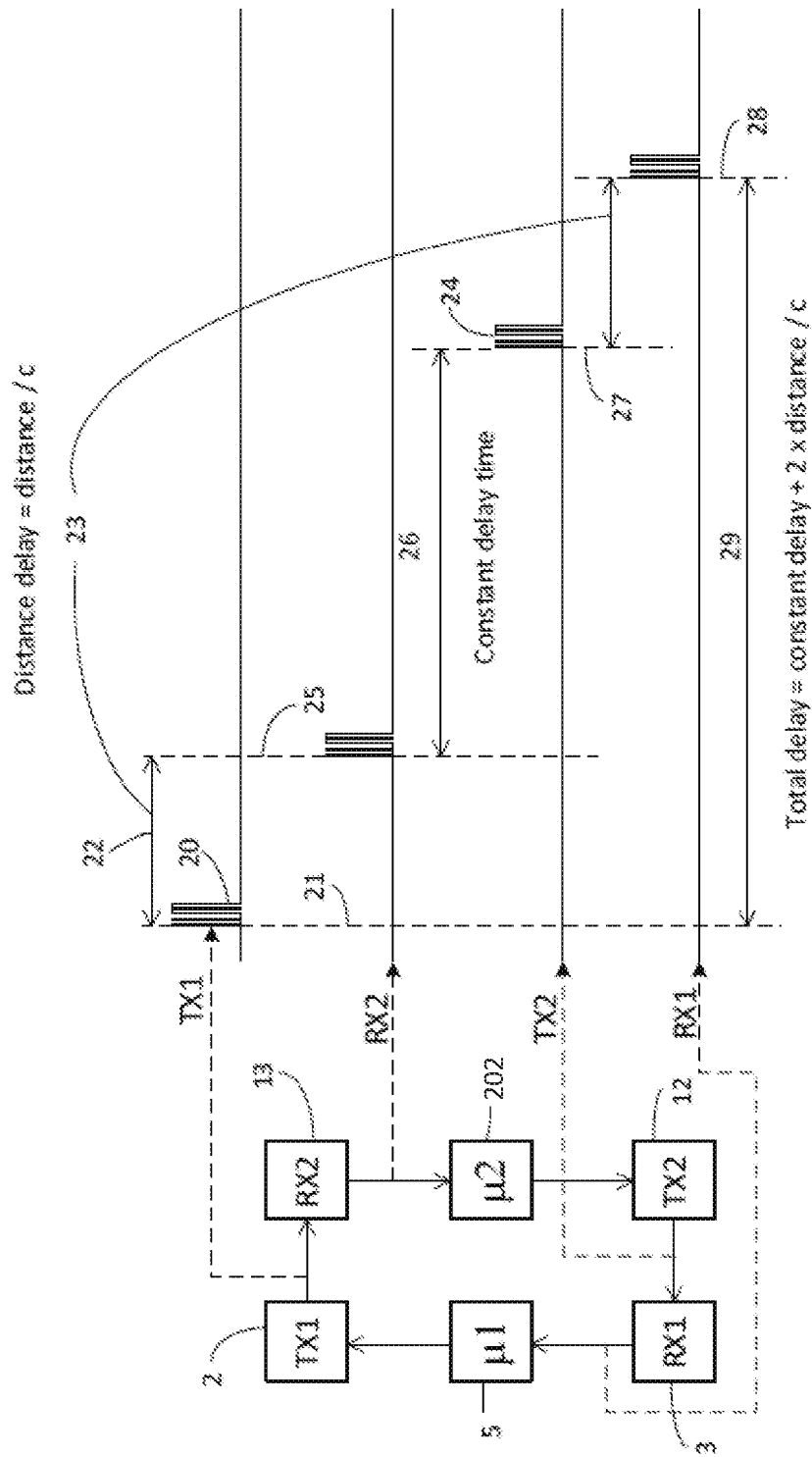
FIG. 2 is a timing diagram showing the distance measurement process.

FIG. 2 illustrates how the device separation may be determined from the data exchange timing. In the sequence on the left, TX1 and RX1 are the RF transmitter 2 and receiver 3 (respectively) of the proximity monitor 1 or 15; TX2 and RX2 are the corresponding elements of the second device 11. The second device has its own microprocessor 202. The microprocessor 5 starts an internal timer at time 21 and sends data to the transmitter 2 which broadcasts the data as a packet 20. This is received by the receiver 13 at time 25 and passed to microprocessor 202. Once microprocessor 202 receives the data, it waits for a fixed time 26 and then issues its own data to its transmitter 12 at time 27. This return data packet 24 is received by the first receiver 3 at time 28 and is passed to the microprocessor 5, which then stops its internal timer. The time recorded by this timer 29 is the sum of the known delay time 26 and twice the device separation divided by the speed of light. The delay time 26 is typically made sufficiently long to overcome any internal microprocessor delays or triggering times, so that the two transit delays may be accurately recorded. FIG. 2 illustrates this process with the leading edge of the data packets 20 and 24 defining the time measurement points, but it will be understood by those skilled in the art that any defined point in the data packets will serve equally well.

In one example, ultrawideband (UWB) technology is used for the RF transmitters and receivers and the associated antennas can be made omni-directional with separation resolution better than 0.5 m. UWB signals can not only communicate data packets effectively over a variety of network configurations but can also, using the method illustrated in FIG. 2, effectively act as low-powered RADAR systems. In some cases in which the UWB antennas are omni-directional, the relative orientation of the communicating devices may be unknown (i.e. the other device could be anywhere on the perimeter of a sphere having the known device spacing). The omni-directional UWB antennas can be replaced with directional versions, however in some situations such as cycle races omnidirectional antennas may be preferable due to the increased flexibility with regard to antenna orientation.

Adding GPS position information to the UWB separation information may provide information as to the order, locations, speeds and/or directions of travel of riders (or of their monitoring devices, at least). When a number of monitoring devices share their GPS and spacing information accuracy may be enhanced. Further, as rider order changes relatively slowly, and consistent with changes in spacing information, a historic record of both GPS positions and UWB separation information can be used to interpolate any gaps in the GPS data, such as would be obtained if riders pass through a short tunnel or forested area or nearby mountains or tall buildings.

Figure 3A:
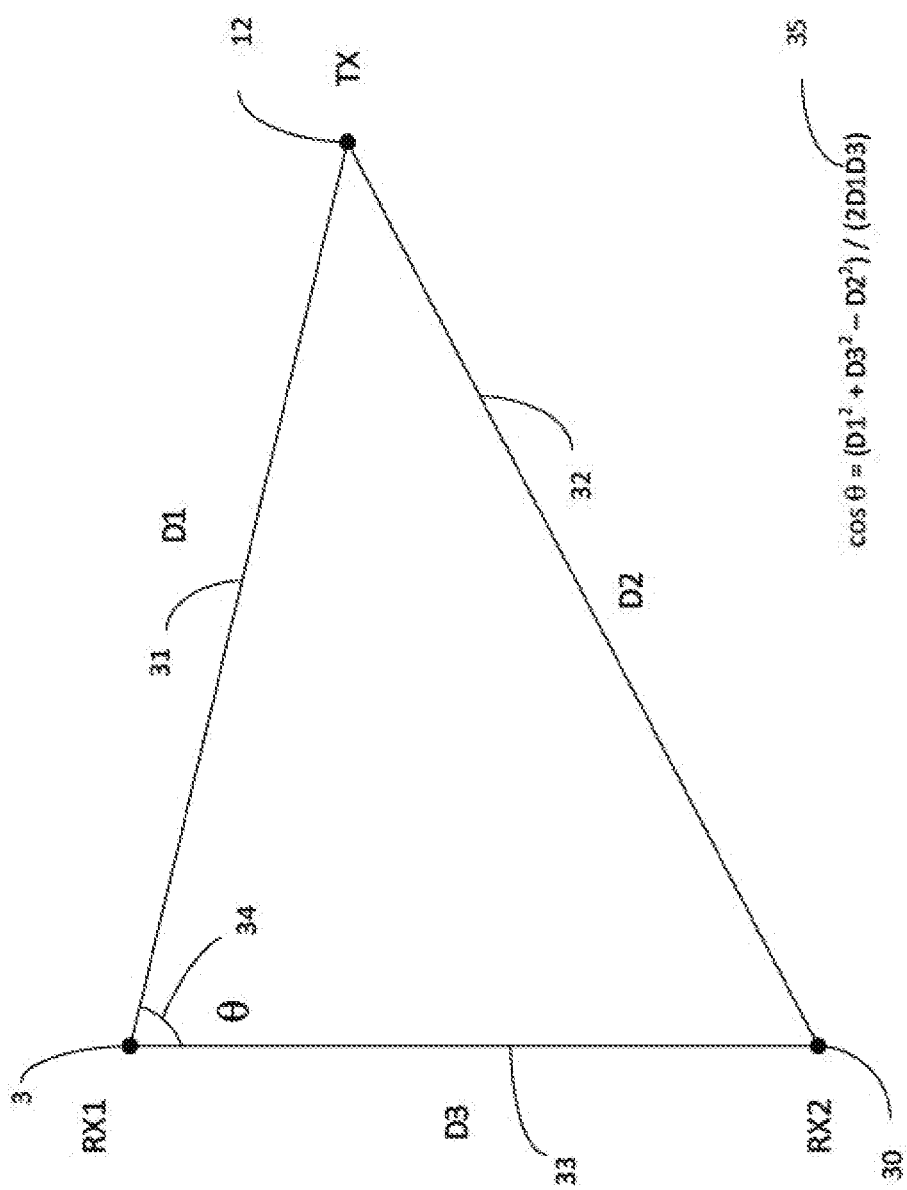
FIG. 3A is a diagram showing a triangulated distance measurement.
Figure 3B:
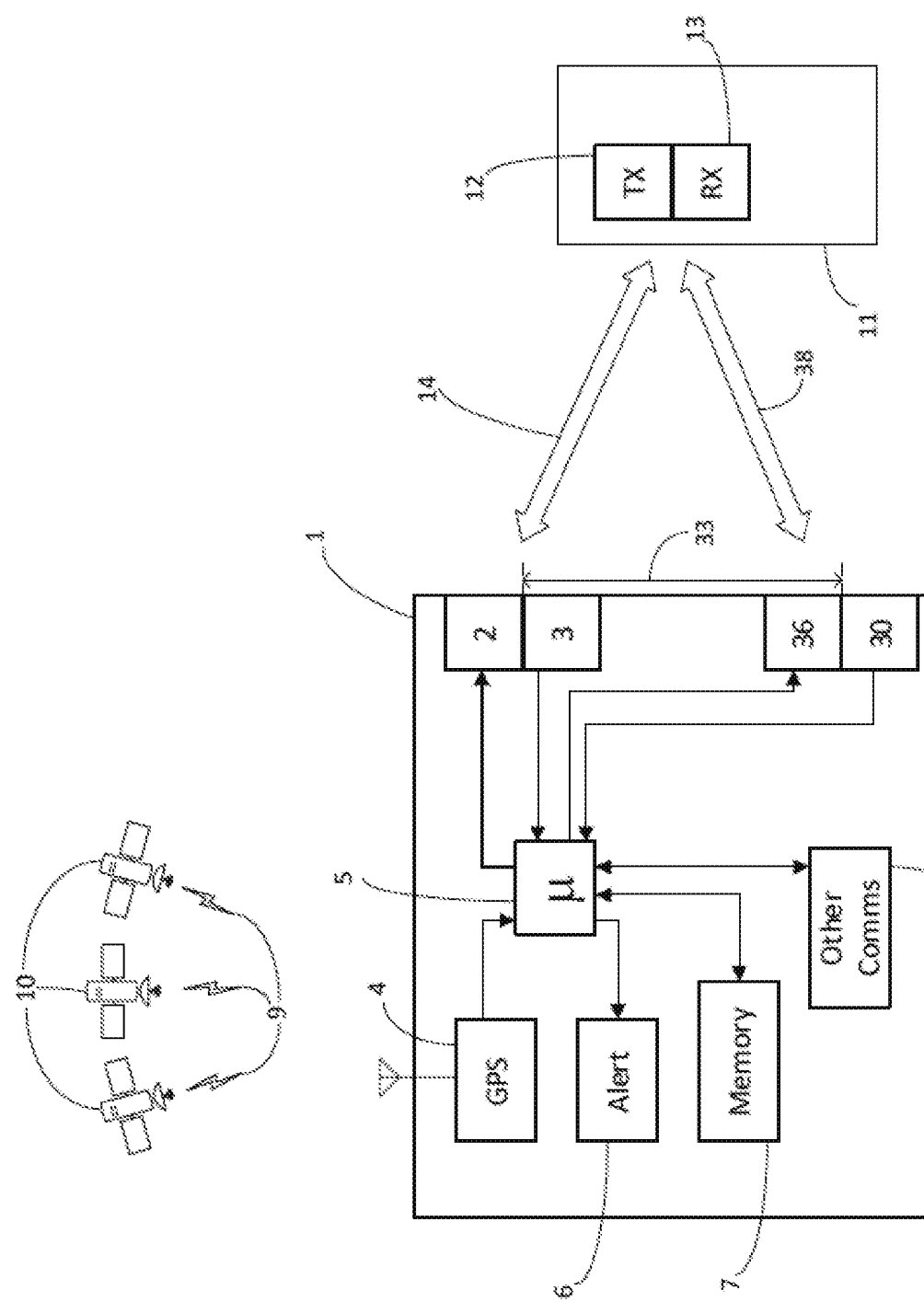
FIG. 3B is a block diagram of a distance measuring device that uses triangulation.

The GPS signal can often have a limited resolution, especially if few GPS satellites are in line of sight. It can therefore be advantageous to combine the proximity monitors 1 or 15 with a second RF receiver, separated from the first receiver 3 by a fixed distance, and then use signal triangulation to determine both the separation and the bearing of the second device 11 (i.e. the direction to the second device). This arrangement is illustrated in FIGS. 3A and 3B, where receivers 3 and 30 are separated by a fixed distance 33. The microprocessor 5 associated with receivers 3 and 30 uses the timing information from the two receivers to determine the distances 31 and 32 between the receivers and the transmitter 12. Knowing the three distances, the angle 34 to the transmitter 12 can be determined using the formula 35. In this arrangement there are two transmitters 2 and 36 co-located at the receiver positions 3 and 30. An alternative embodiment uses two transmitters at known locations, with a single receiver and a microprocessor performing the triangulation calculations. The two receivers 3 and 30 and/or the two transmitters 2 and 36 can be spaced apart along the longitudinal axis of the cycle (i.e. the general direction of travel of the cycle) in use. This is to enable the proximity monitor 1 or 15 or a remote device to distinguish between transmitter locations in front of and behind the cycle bearing the proximity monitor 1 or 15.

In the example of FIGS. 3A and 3B, the two transmitters 2 and 36 and two receivers 3 and 30 are part of the same proximity monitor, however two separate proximity monitors 1 or 15 may be provided on each cycle with each proximity monitor 1 or 15 having a single RF transmitter and a single RF receiver.

Figure 4:
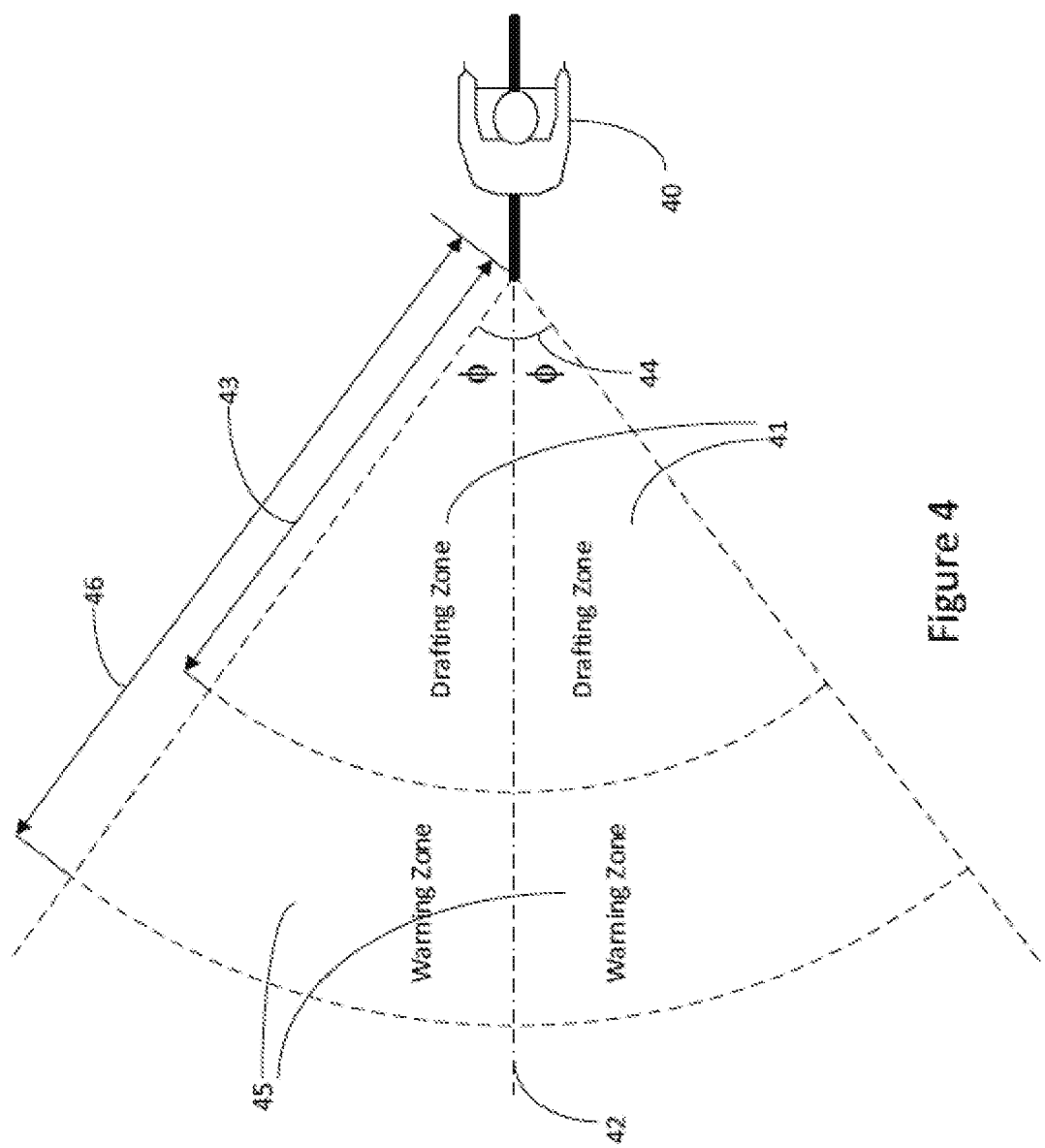
FIG. 4 is a diagram showing warning and drafting zones behind a cyclist.

Knowing the separation and direction information accurately is critical for identifying drafting events in a cycle race. FIG. 4 illustrates the separations and directions that can be used to determine whether a drafting event is occurring and to generate the appropriate alert in the alert module 6. In one example the microprocessor 5 of the proximity monitors 1 or 15 determines whether a drafting event is occurring. In another example, the microprocessor 5 may determine a potential drafting event and, in response, transmit a message to a remote device, in which case the remote device or a user thereof may determine whether a drafting event is occurring or has occurred. In another example, the proximity monitor 1 or 15 may continuously transmit information to the remote device without the need to make a determination of a drafting event or potential drafting event.

Immediately behind a cyclist 40 there is a rule based drafting zone 41, symmetrical on the longitudinal or front-rear axis 42 of the cycle and defined by a fixed radius 43 and segment angle 44. Any cyclist detected in this zone must be in the process of passing the lead cyclist 40 or falling back behind the lead cyclist 40, and so must not be in this zone for more than a certain length of time and must not enter the zone from behind then exit from behind. A pass manoeuvre, once initiated by entering the lead cyclist's drafting zone 41, must be completed by overtaking that lead rider within the specified length of time. There can also be a warning zone 45 behind the drafting zone 41 and this is defined by the same segment angle 44 and a second distance 46. The microprocessor may trigger the alert module 6 to generate a warning signal if a trailing rider enters this warning zone. The exact definition of a drafting zone is rule and condition dependent—gradient, speed, wind, and the course can all affect what criteria are applied to determine the relevant drafting and warning zone parameters. There may also be places in the race course where drafting detection and proximity monitoring is disabled, for example at the start of the race or in steep sections of the course where speeds fall below a certain level (causing following distances to decrease) and are so low that drafting gives trailing riders very little real or measurable advantage. Drafting may also be disabled for slow competitors falling below a given metric (speed, position etc.). GPS position information can be used to determine when to enable or disable drafting detection for these and other reasons (e.g. non-drafting zones). Such non-drafting zones may be mass pre-loaded to memory 7 of a monitoring device 1 of each competitor prior to a race. The batteries of monitoring units may also be mass charged, preferably via wireless charging. GPS information can also be used to record the cyclist's speed and heading, and whether they have entered certain areas for specific purposes, such as waiting out any allotted penalty time.

Figure 5:
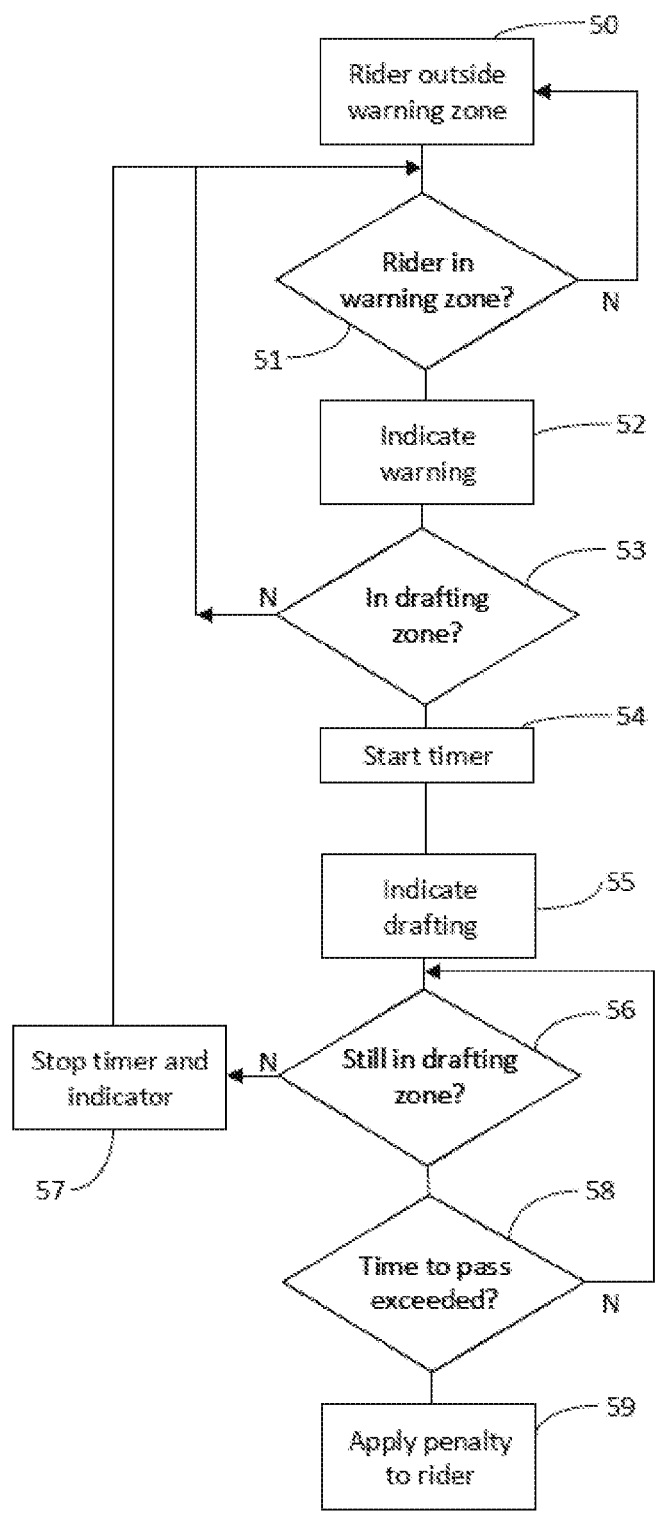
FIG. 5 is a flow chart showing a drafting detection and penalty application process.

FIG. 5 shows a flow chart for identifying warning and drafting events according to one embodiment. The proximity monitor will (at step 50) first detect an approaching rider further away than the warning zone. The proximity monitor periodically checks whether the rider has entered the warning zone (at step 51) and, if so, trigger a warning event (step 52) which may take the form of a solid or flashing coloured or white light, an audible alarm or some other suitable indication. As long as the trailing rider stays in the warning zone, the warning event will continue. If it is determined that the trailing rider moves into the drafting zone (step 53) then a timer is started (step 54) and a drafting event is indicated (step 55). This may take the form of a flashing or non-flashing light or a constant tone or some other suitable indication. The proximity monitor periodically checks whether the trailing rider is still in the drafting zone (at step 56) and, if not, stops the timer and indicator (at step 57). If the trailing rider remains in the drafting zone for more than a specific length of time (at step 58) then a penalty may be applied to the trailing rider. If the trailing rider enters the drafting zone, and then drops backwards from the leading rider, this is recorded as a drafting event, and the time spent in the drafting zone for the duration of this drafting event is recorded and a penalty may be applied to the trailing rider. If the leading rider is passed by another rider and does not drop back in a suitable amount of time, this may be recorded as a drafting event and a penalty may be applied to the passed rider. This penalty is typically stored in the memory of the trailing rider's own proximity monitor but a record may also be kept in the memory of the proximity monitor of the leading rider, may be shared with all devices in range, out may be output to a referee presently within range or when they subsequently come within range.

In another embodiment of this invention, the proximity monitor of the rider being passed includes speed or acceleration sensors, and can determine if the lead rider significantly increases their speed when a trailing rider is in the lead rider's warning or drafting zones, as would be the case if the lead rider was trying to prevent the trailing rider from passing them. In a further embodiment of this invention, GPS position data is exchanged at a variable rate between two proximity monitors. This exchange rate is typically increased during passing events.

Figure 6:
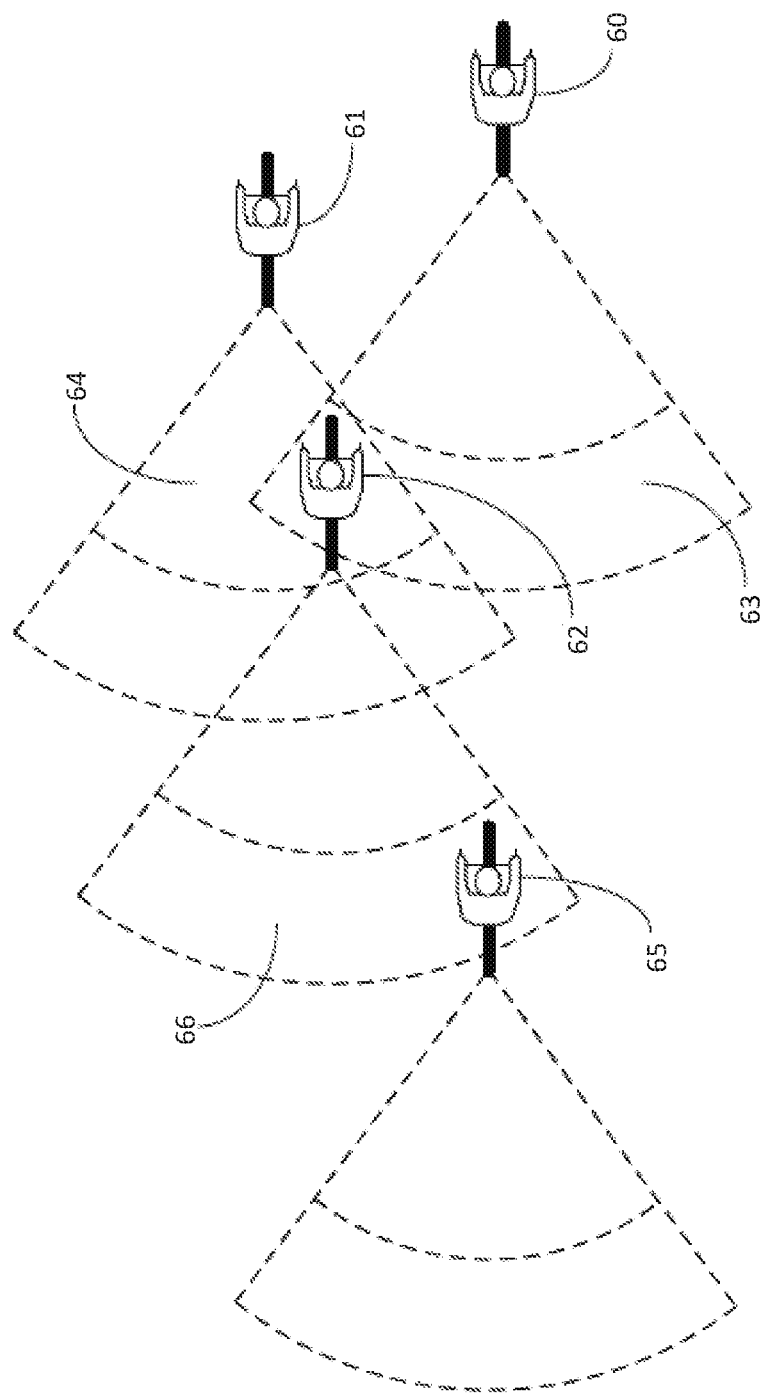
FIG. 6 is a diagram showing possible communication paths between devices.

This method illustrates also why it is advantageous to use either GPS or dual RF receivers (or transceivers) and triangulation to determine which rider is leading and which rider is trailing. In certain circumstances, multiple warning or drafting events may be occurring simultaneously, as shown in FIG. 6. Rider 61 is passing rider 60. Rider 65 is in the warning zone 66 of rider 62. Rider 62 is in the warning zone 63 of rider 60 and is also in the drafting zone 64 of rider 61. In situations like this, the UWB and/or Bluetooth transceivers of the various proximity monitors can form an ad-hoc mesh network, record all of these events and save real-time position and event information from all the riders.

In another embodiment, the order of riders can be determined optically if each bicycle is fitted with a forward-mounted optical detector and a rear-facing optical emitter. The emitter emits a broad beam of light that substantially covers the angle 44 of the warning and drafting zones, and repeatedly transmits a code which is unique to the bicycle. Any detector within range of a leading emitter will receive the code, so any associated processor will record which rider is ahead.

In another embodiment, some or all of steps 50, 51, 53, 54 and 56-59 can be performed by a remote device or a user thereof. For example, the method may proceed as discussed above up to step 58. Once the time to pass is exceeded in step 58, a potential drafting event may be determined, which prompts a remote device or user thereof to determine whether a penalty should be applied. In a preferred example, a human referee is provided with information that enables them to determine whether a penalty should be applied and to cause the penalty to be applied to the trailing rider.

In one embodiment one or both of, steps 52 and 54 are performed by a corresponding proximity monitor associated with the trailing rider.

Figure 7:
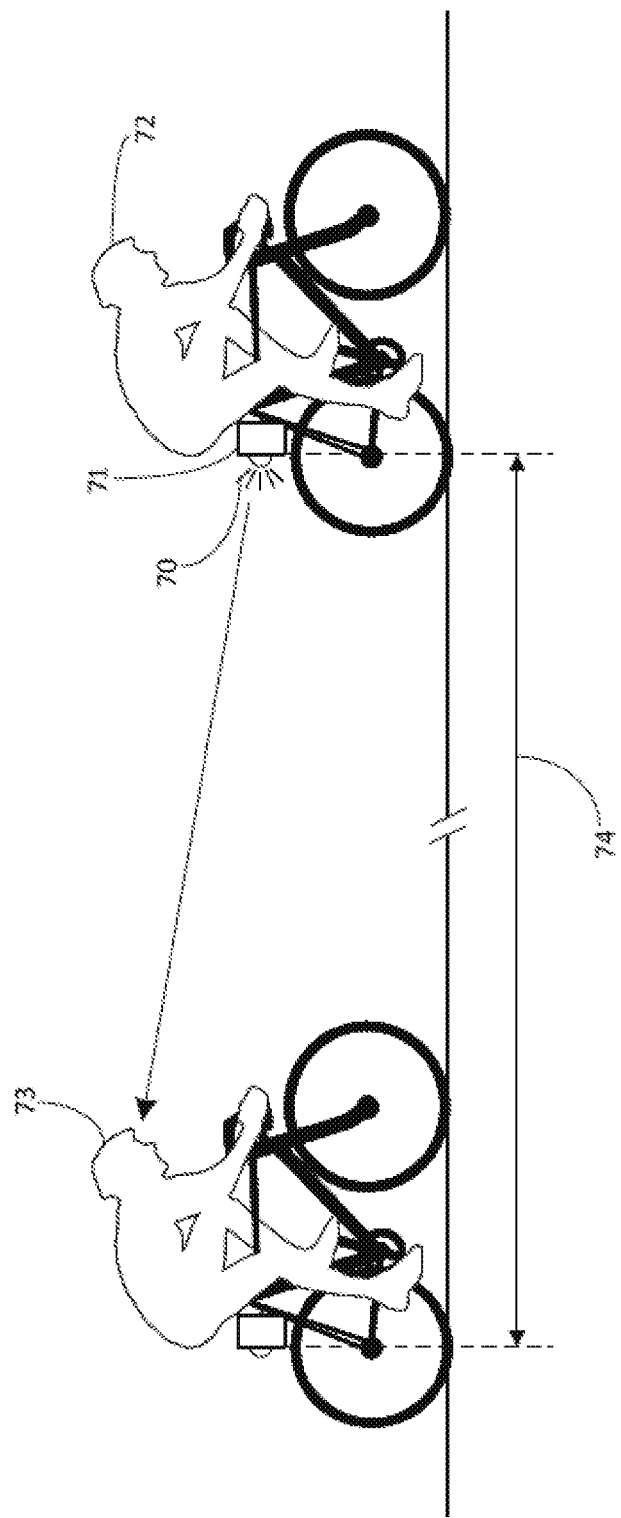
FIG. 7 is a diagram showing how a rider may be informed of their proximity to another rider.

As mentioned in the method shown in FIG. 5, it is advantageous to let the trailing rider know if they have entered the warning or drafting zones of a lead rider. It is difficult to judge precise distances and angles while riding. One example is shown in FIG. 7, whereby a rear-facing visual indicator is included in the proximity monitor of each rider. This can indicate to a trailing rider when they have entered another rider's drafting or warning zones. The trailing rider 73 has moved to within a certain distance 74 of the lead rider 72, causing the proximity monitor of the lead rider 71 to generate a warning and activate the visual indicator 70. As previously mentioned, this may take the form of a solid or flashing lamp if the trailing rider is in the warning zone, or a continuous light if the trailing rider is in the drafting zone. Different colours or spatial or temporal patterns may also be used to indicate different alerts in other embodiments of the invention. For example, an accrued penalty may be indicated with a flashing red/blue light.

A visual signal may be presented at the front of the trailing rider's bicycle, so that it may be seen if the rider is looking at, for example, their handlebar-mounted cycle computer. An audio signal may be presented to trailing rider. The audio signal may be presented by the trailing rider's cycle or proximity monitor or by the other rider's cycle or proximity monitor. In one example, a speaker is mounted to the forks of each cycle. In one example, a light is mounted at the front of each cycle and configured to direct light upwards to the rider's face. In a preferred embodiment, the trailing rider is presented with an audio signal from a device on their own cycle and subsequently presented with a light signal directed upwards at their face from a light source near the front of their cycle. Presenting the alert on a trailing rider's cycle may be advantageous in cases where applying a penalty takes a significant amount of time, for example when a referee makes a determination to apply a penalty. In these cases, the leading rider's cycle may not be easily viewable by the time the penalty is applied.

Figure 8:
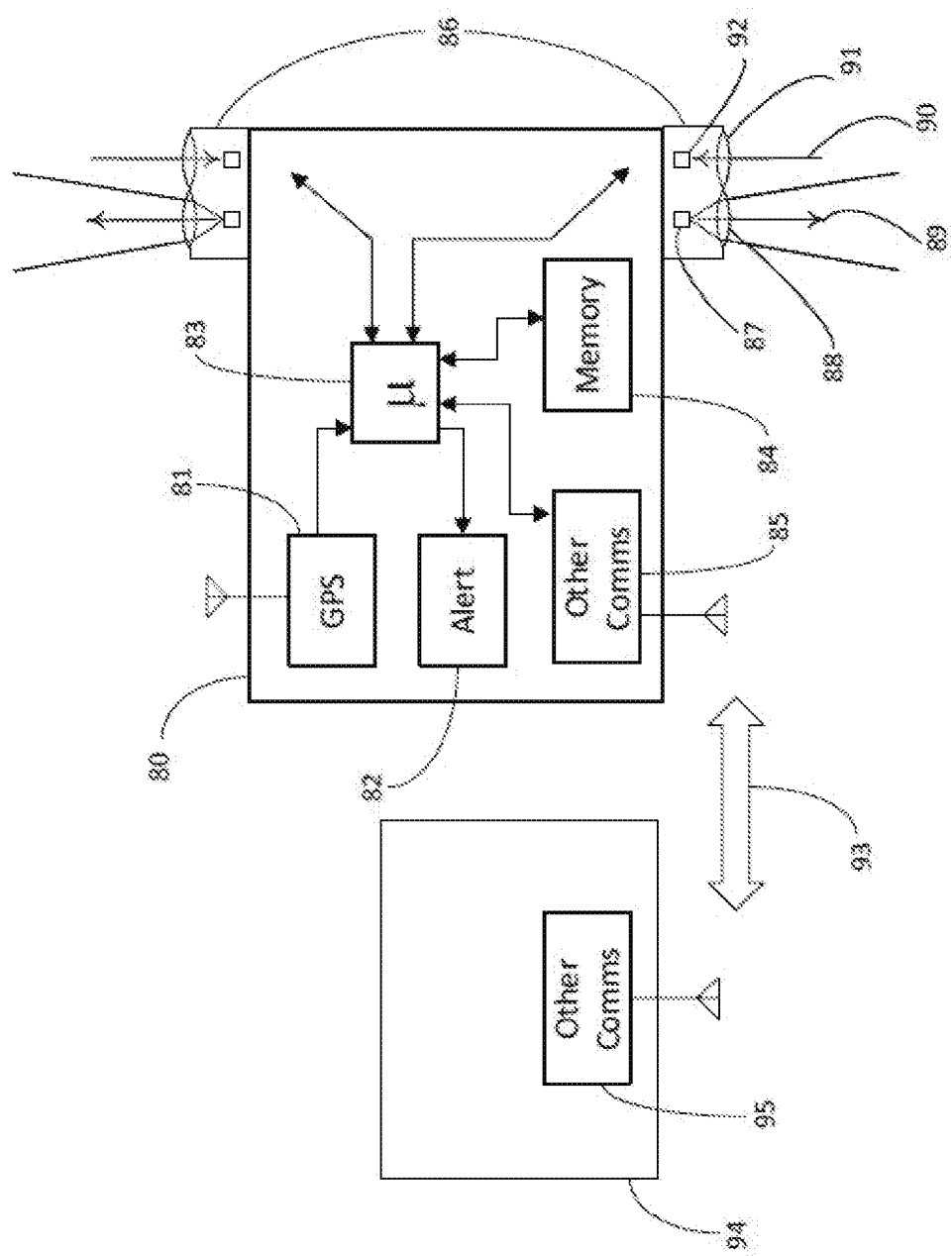
FIG. 8 is a block diagram of a further embodiment of a user device that detects passing events.

In other embodiments of the invention, proximity and passing detection can be performed optically, as illustrated in FIG. 8 which is the block diagram of a passing detector.

The passing detector 80 includes a GPS unit 81, an alert module 82, a microprocessor 83, a memory module 84 and a means of data communication 85. It also includes two optical modules 86, pointed in different directions. In each of these modules, a light source 87 (which could be a laser or LED) emits light in a fan 89 through a lens 88. Any light 90 received from a light source of a detector on another bike will be captured by lens 91 and focused onto a detector 92. The light fan 89 can be positioned, shaped and oriented so that it is directed across a desired passing zone. The light from one or more of these modules may be modulated with a code that identifies the passing detector that these modules are attached to. Microprocessor 83 may use detection information from detector 92 to determine the moment of pass. A code modulated onto light 90 may also be used to identify the detector of the other bike. Such a unit provides precise determination of a pass so that a lead rider may be informed that a pass has occurred and that they must drop back. Events and GPS positions can be stored in memory 84 and this data 93 can be communicated to another device 94 using the communication means 85 and 95.

Figure 9:
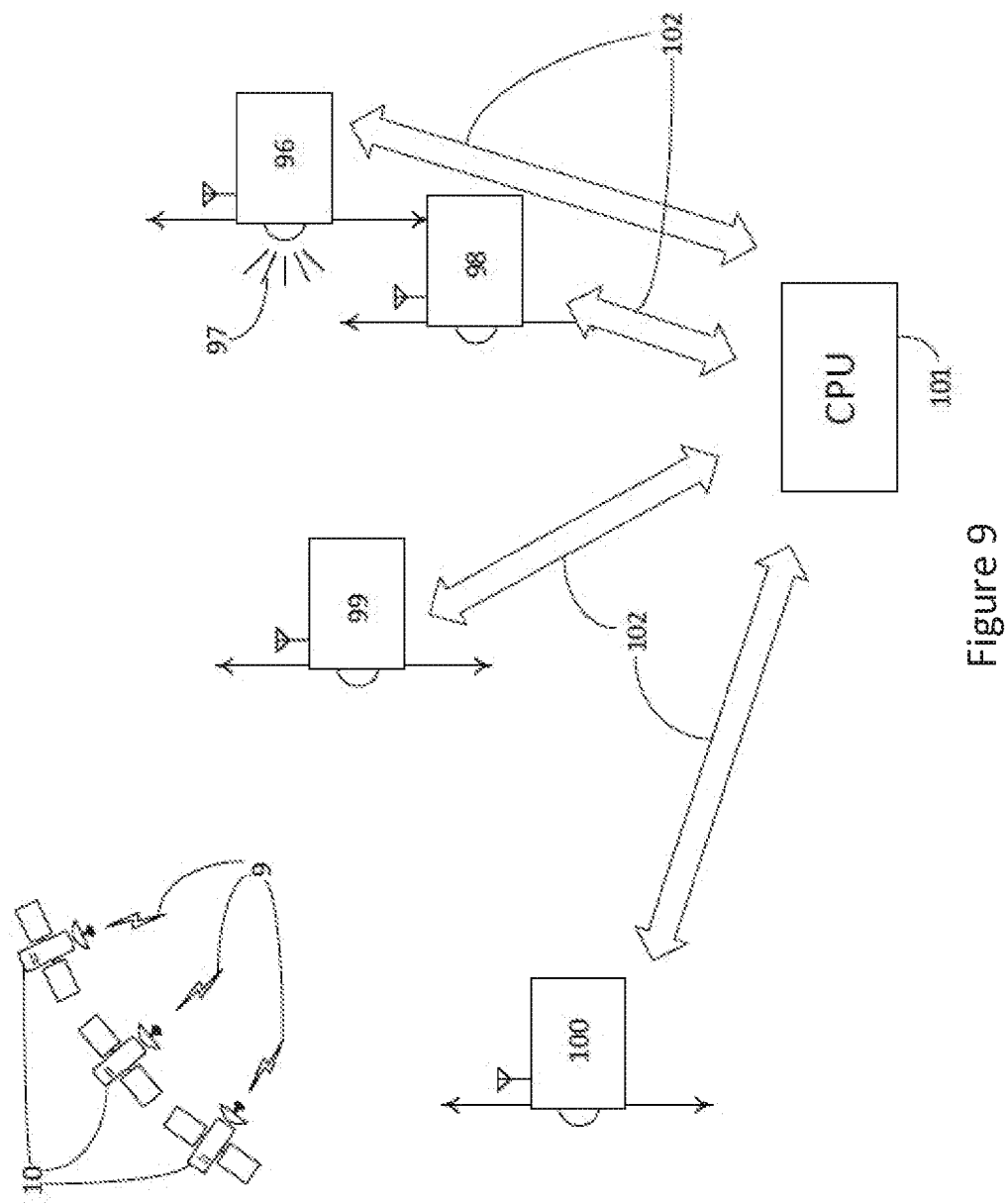
FIG. 9 is a diagram showing communication paths between passing event detectors.

FIG. 9 illustrates how these passing detectors can be used in a race. The passing detectors 96, 98, 99 and 100 are attached to bicycles (not shown) and are receiving GPS signals 9 from GPS satellites 10 so that each passing detector knows its own position. Detector 98 is in the process of passing detector 96. In this example all passing detectors are in communication 102 with a central computer 101. The central computer 101 has received the position and passing event information from detector 96, has determined that detectors 96 and 98 are in a zone where drafting is not permitted, so has activated the event module of detector 96, causing it (in this illustration) to flash a warning light 97.

In another example, each cycle includes two RF transmitters 2, 36 and two RF receivers 3, 30 and performs triangulation to determine the angle to other cycles as discussed with respect to FIGS. 3A and 3B. The determined angle can be used to detect when one cycle has passed the other.

In other embodiments of the invention, if a rider accrues any penalties, a penalty enforcement system can then be used. In its simplest form, this penalty enforcement system includes a plurality of penalty detectors or one or more referees, a means of communicating any accrued penalties and some indicator that indicates a penalty to a rider. In other embodiments, the penalty enforcement system also includes monitoring the position of a penalty notification device and/or a rider, and a means of informing the rider when their accrued penalty has been served.

The penalty may be served by a rider in several possible ways, including:
  Geo-fence (GPS based)—rider must go to a demarcated zone and stop until penalty period completed (light turns off or different light turns on).
  Beacon proximity—rider must go to a demarcated zone and remain in required proximity to a beacon until penalty observed.
  Any location—rider simply has to stop somewhere for a period of time. This is simple but less safe.
  End zone—rider must complete penalty time in a zone at the end of a race.
  Post race—all information and penalties applied based on post race calculations.
  Drop back—require rider to drop a prescribed distance behind another rider.
  Speed—the rider is required to keep their speed below a low maximum speed for a certain time.

Figure 10A:
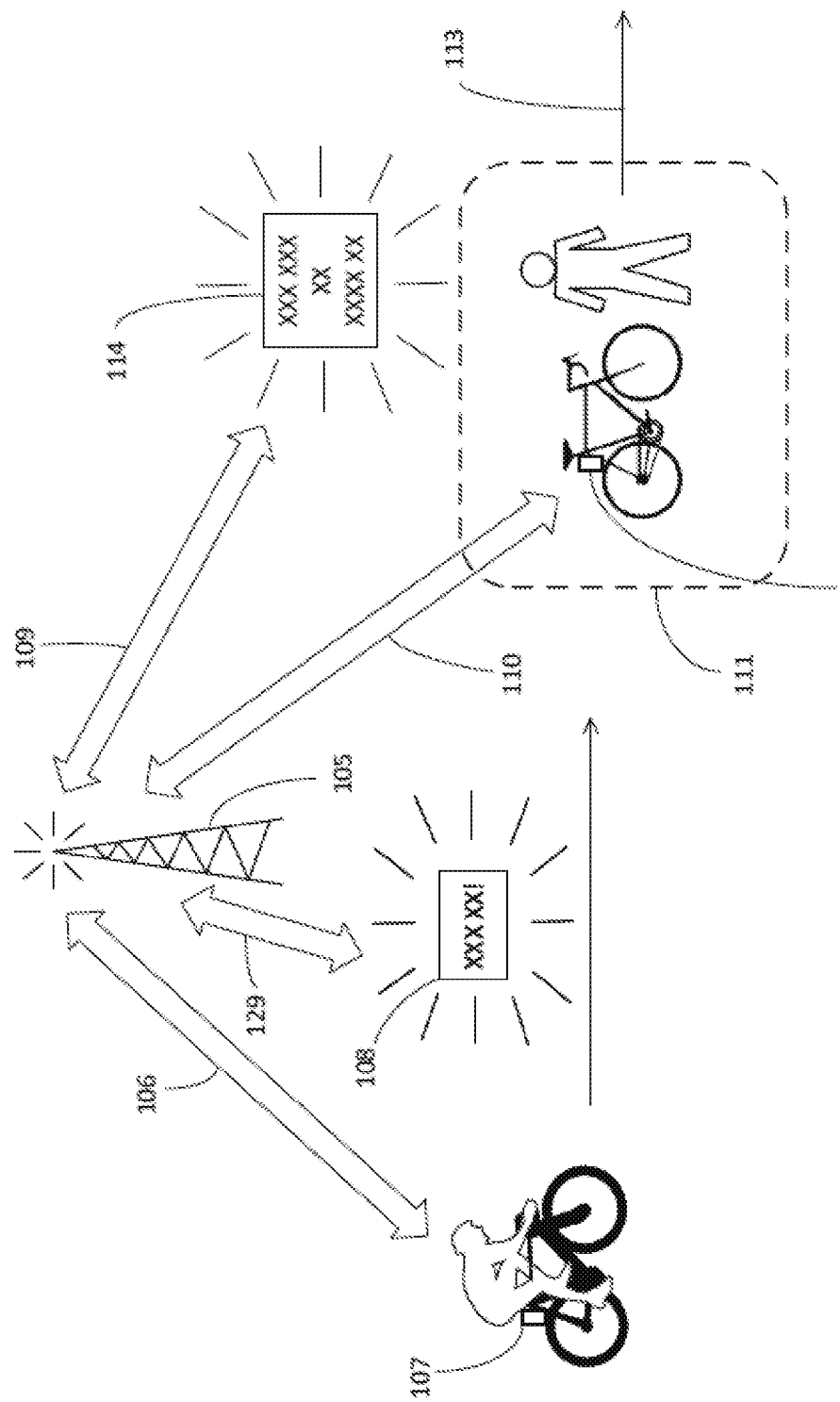
FIG. 10A is a diagram showing a penalty enforcement system.

FIG. 10A illustrates the geo-fence embodiment of the penalty enforcement system. A course beacon 105 communicates with a rider's proximity monitor 107 and determines that the rider 107 has accrued a penalty. The beacon 105 then communicates 129 with an illuminated sign 108, which directs the rider to stop within a certain area 111. The sign 108 may also indicate that the rider 107 has accrued a caution. The beacon also communicates to an audible alarm to attract the rider's attention. The rider's name and competitor ID can be displayed on the illuminated sign 108. This may have the effect of discouraging future drafting by the penalised rider or other riders.

The beacon 105 communicates 110 with the penalty monitor 112 and checks that the rider is within the zone. Once a certain time has elapsed, the beacon 105 communicates 129 with the sign 108 (or communicates 109 with another screen or sign 114), which then informs the rider that they can leave the zone 113. In other embodiments of this invention, the beacon 105 may be included in the signs 108 and/or 114, or the signs 108 and/or 114 may communicate directly with the proximity monitor 107, 112 without an additional beacon 105. The signs may also take the form of an indicator (FIG. 13, 158) mounted in sight of the rider. In another embodiment of this invention, multiple penalties may be served all at once or in a series of penalty events; for this to happen, the penalty system can either erase all of a rider's accrued penalties, or erase some smaller subset of the accrued penalties and force the rider to serve out the remaining penalties at some other time or place.

Figure 10B:
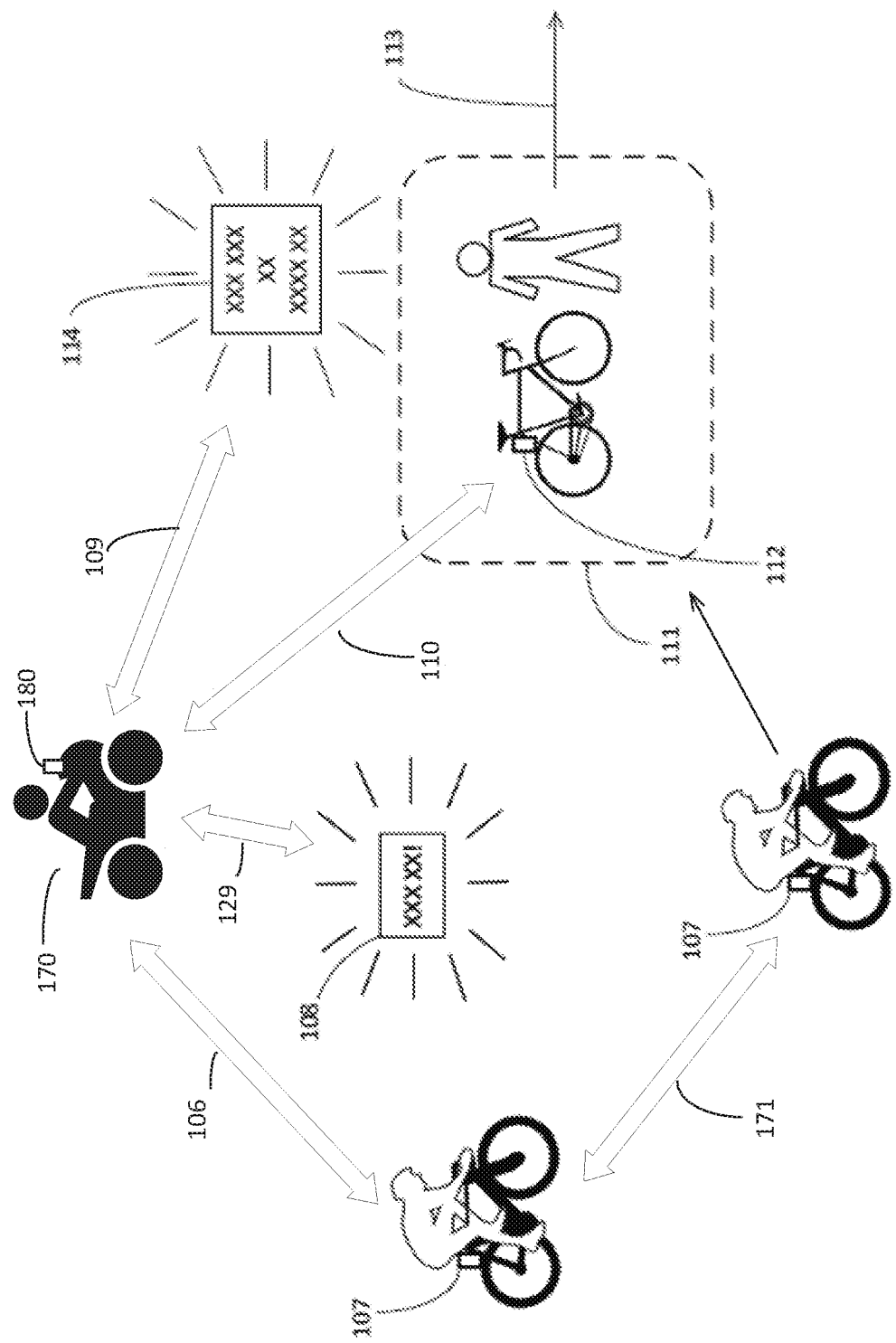
FIG. 10B is a diagram showing an alternative penalty enforcement system.

FIG. 10B shows an alternative penalty enforcement system. In this case, a referee 170 receives communications from the proximity monitors 107. These may be long-range communications transmitted and received using long-range communication modules of the proximity monitors 107 and of a remote device 180 (detailed in FIG. 15) carried by the referee 170. In one example, the communications are LoRa or LoRaWAN communications transmitted and received using LoRa or LoRaWAN modules. The proximity monitors may communicate 171 with each other to transfer information between each other but also to propagate information to the referee 170 or a beacon (shown as 105 in FIG. 10A). The communication 171 between proximity units can be relatively short-range communication. In one example, the communications are via Bluetooth. In this example, the proximity monitor 107 of one rider may communicate to the referee's monitoring device 180 information regarding a proximate rider. If the referee 170 applies a penalty or a caution, a message can be transmitted to the proximate rider's monitor 107, the penalty monitor 112, and/or to the sign(s) 108, 114.

Figure 11:
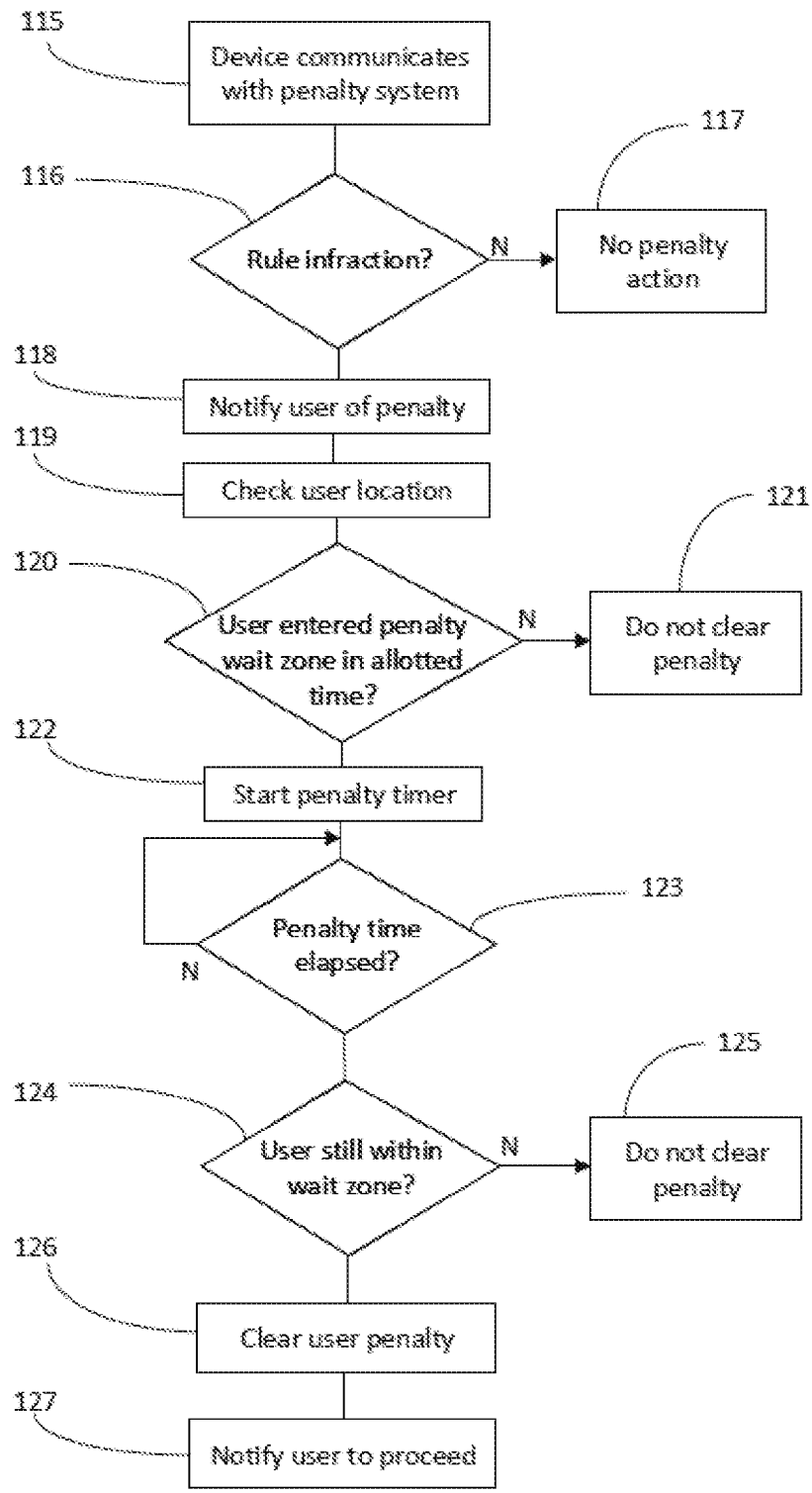
FIG. 11 is a flowchart showing the penalty enforcement process.

FIG. 11 shows a flowchart of the penalty enforcement system according to one embodiment. A rider's proximity monitor communicates with the penalty enforcement system at 115. The penalty system checks whether a rule infraction has occurred (116); if not (117), no penalty is applied. If there has been a rule infraction, the rider is notified (118) of a penalty. The system may, if desired, check the rider location (119) and determine (120) whether the rider has entered a penalty waiting zone within an allotted time. If the rider has not entered the zone within this time, the penalty is retained (121). This check can also be whether the rider has moved past the penalty zone. If the rider has entered the zone, then a timer is started (122). The system then waits until the penalty time has elapsed (123) and then checks whether the rider is still within the penalty zone (124). If the rider has left early, then the penalty is not removed (125). Otherwise the penalty is cleared (126) and the rider is notified that they can proceed (127). In another example, one or more of the steps of 116-127 is performed by, or with the input of, a user of a remote device. This user may be a race referee.

Figure 12:
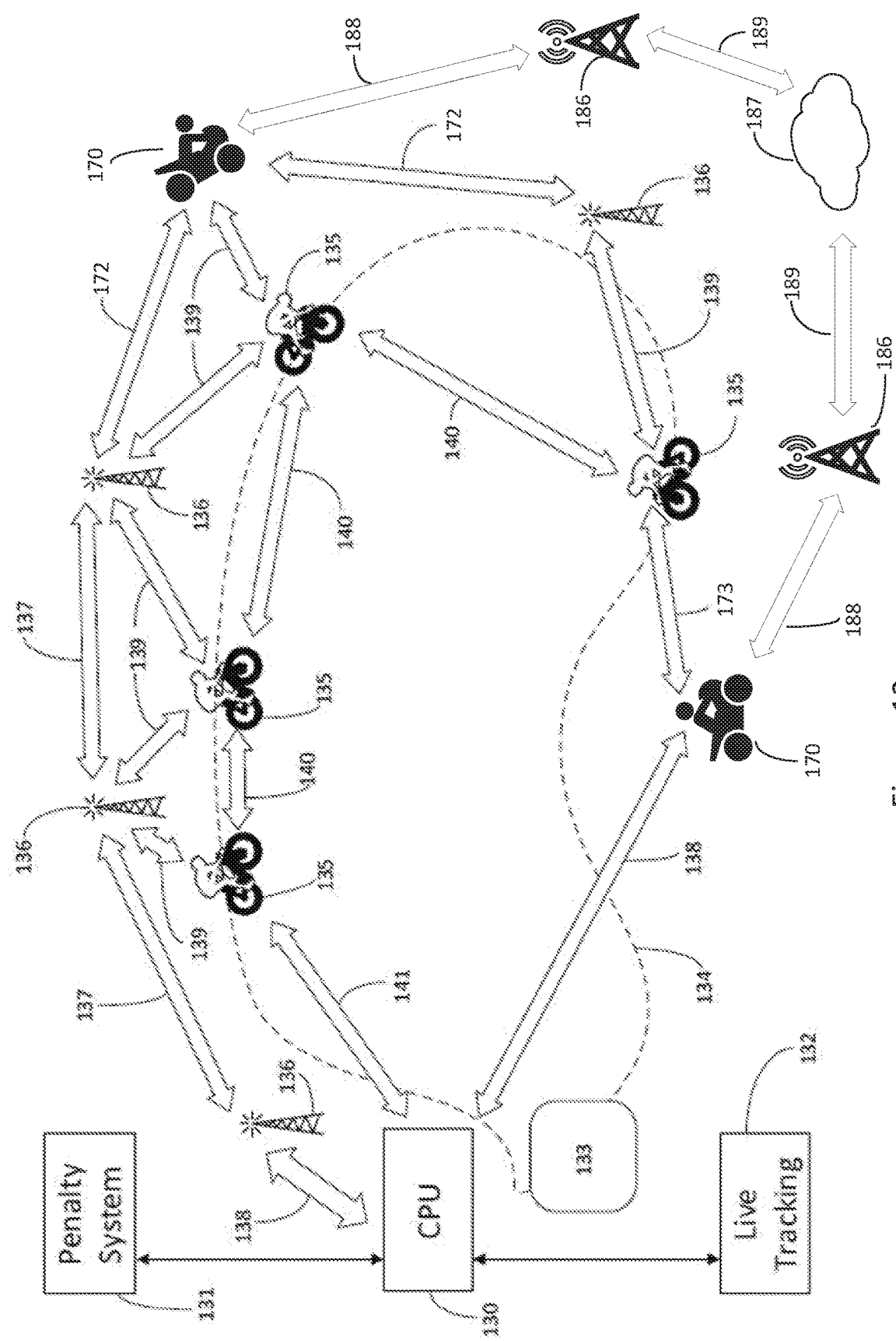
FIG. 12 is a diagram showing the use of communication beacons around a race course.

In cycle races, it is desirable to be able to communicate with all riders and to monitor things like their vital signs, their race position and speed and any penalties accrued or being served. For this all to happen, some sort of race communication system must be implemented. FIG. 12 shows an embodiment of such a race communication system. The race course 134 starts and stops within a certain area 133, at which is commonly located a central processor 130 that may include a penalty enforcement or monitor module 131, and a display unit 132 that lets spectators see the race in progress. Spectators may follow riders' online viewing race metrics as well as penalty information for each rider. In other embodiments of the invention, the race course may have different starting and finishing locations.

In an embodiment of the invention, several beacons 136 are placed at fixed positions along the course 134. The central processor 130 can communicate 138 with these beacons and the beacons can communicate 139 between each other to form an ad-hoc mesh network, ring network or other suitable network architecture. Individual riders also have proximity monitors 135 and these monitors can communicate 140 with each other. The proximity monitors 135 can also communicate 139 with course beacons 136. The proximity monitors 135 can also communicate 141 with the central processor 130. These multiple communication pathways also form an ad-hoc network that can be dynamically configured or re-configured in use as its topology changes. Communication 139 between a single proximity monitor and two course beacons can be used to triangulate the position of the proximity monitor. In this and other similar embodiments, penalty information can be passed back to the penalty enforcement module 131 or retained and adjudicated within the proximity monitors 135 themselves. The beacons 136 may include illuminated signs 108 (FIGS. 10A, 10B). GPS position, biometric information, penalty data or other race history data can be stored within individual proximity monitors 135 for downloading into the central processor 130 at the end of the race. Centralised monitoring of GPS positions can also be used to check whether riders have gone off-course or have stopped unexpectedly, which may be due to a crash.

In one embodiment, one or more referees 170 may carry monitoring devices 180. The monitoring devices 180 may be configured to communicate 173 with the proximity monitors 135 directly or communicate 172 via beacons 136. The proximity monitors 135 may transmit information to the referees' monitoring devices 180 such that referee 170 can assess the data to determine, for example, whether a penalty should be applied or whether a penalty has been served. The monitoring devices 180 may also be configured to communicate with a wide area network 187 such as the internet. To this end, one or more radio transceivers 186 may be employed to communicate 188 with the monitoring devices 180. The transceivers 186 may be, for example, cellular communication towers. The transceivers 186 may in turn communicate 189 with the wide area network 187. In one example, each monitoring device 180 has installed thereon an application which can be used to monitor competitor's locations, separations and other data, assess potential offences and issue penalties or cautions, and/or view penalties or cautions applied by other referees. The application may be a client-side application in communication with a remote server over the network 187, such as a cloud-based server. When referees issue penalties and cautions, this information may be uploaded to the remote server over the network 187. The referees may also view the information uploaded by other referees over the network 187. This may allow referees to have complete knowledge of penalties and cautions applied to all competitors without the need to be in line of sight or proximity of them and may allow referees to concentrate on rule application rather than on-course policing of penalties. It also may allow referees who are outside the immediate vicinity of the riders who are committing offences to apply penalties and cautions to those riders. This may improve competitor behavior and reduce rule circumvention.

Figure 13:
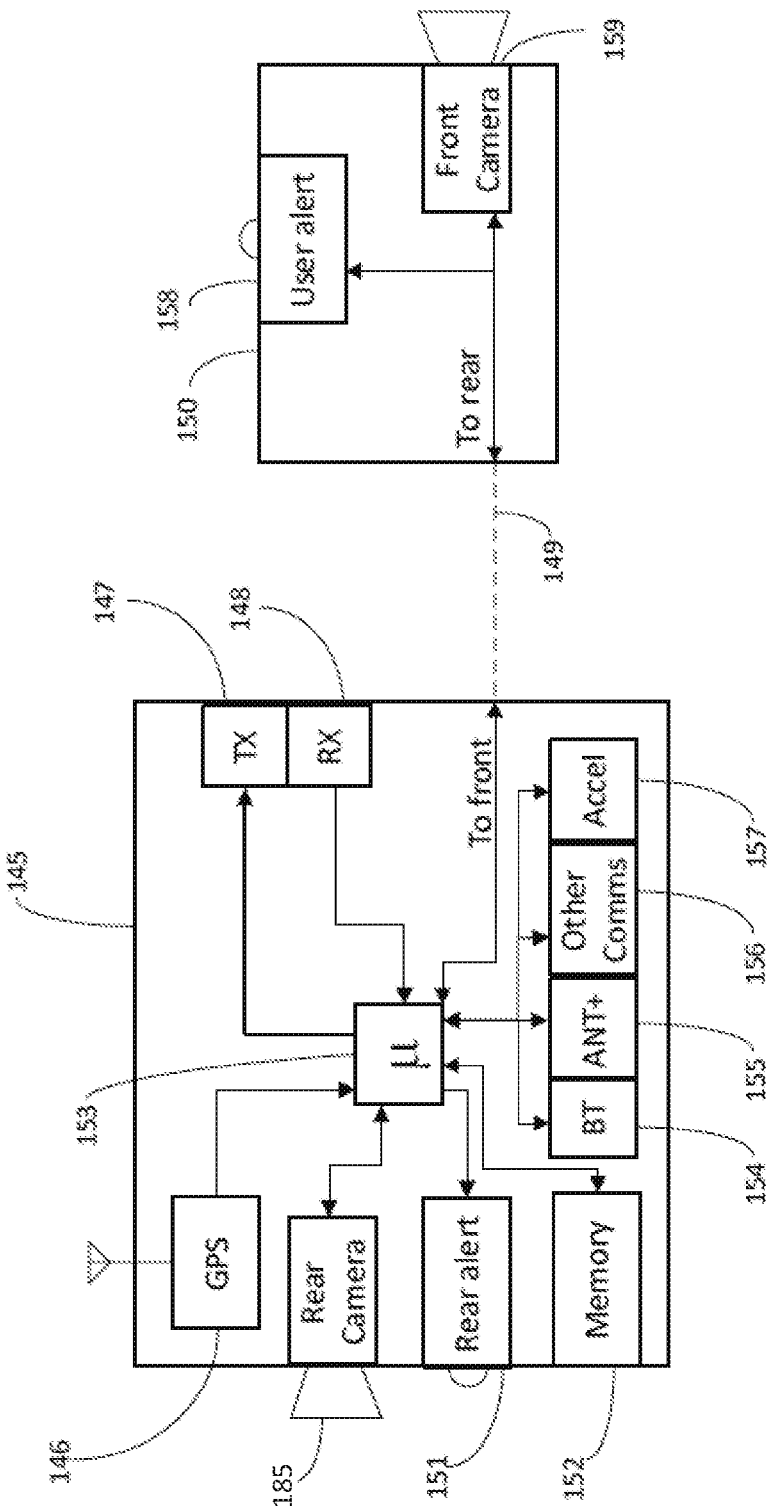
FIG. 13 is a block diagram of a further embodiment of a distance detection system.

In one embodiment, the proximity monitors 135 communicate with each other using Bluetooth communications. In one example, the proximity monitors communicate 173 with beacons 136 and/or referees' monitoring devices 171 using LoRa or LoRaWAN communications. The various embodiments of the proximity monitors or passing detectors can also be augmented by the addition of other functions or modules. One such embodiment of an augmented proximity monitor is shown in FIG. 13. This proximity monitor 145 includes a microprocessor 153, an RF transmitter 147, an RF receiver 148, a Bluetooth link 149, a memory module 152, a GPS receiver 146 and some other means of communications 156, which is required to access the microprocessor 153 or the memory module 152. This monitor is similar to that described in FIG. 1.

The monitors can perform Bluetooth beaconing for advertising their presence to other monitors within range. Based on Bluetooth beacon signals, the monitor may determine which other monitors to determine the distance to using the RF transmitter 147 and receiver 148. For example, the monitor could measure the distance to the nearest N other monitors or measure the distance to all other monitors within X metres. In one example, N is approximately 5. In one example, X is approximately 30. The may reduce the bandwidth used by the RF transmitters and receivers for ranging. It may also reduce power consumption because Bluetooth beaconing is relatively low-power but long range. In order to determine which other monitors are nearest, a proximity monitor could use an indication of the signal strength of received messages. For example, the 4 or 5 monitors with the highest received signal strengths could be selected for the distance measurement. Alternatively, all monitors with a signal strength above a threshold could be selected. In this scenario, the Bluetooth mesh can still be used to communicate information between the monitoring devices of the competitors.

This monitor also includes:
- a rear alert module and indicator 151;
- a rear-facing camera 185 for recording the image of any trailing riders;
- BLE 154 and ANT+ 155 modules for communicating with cycling computers, watches or other biometric or other telemetry devices;
- an accelerometer 157 which can detect any impacts or falls, permitting the processor 153 to communicate this sort of event to other riders or race officials; and
- a front-mounted module 150 that includes:
  - a user alert module 158 that gives the rider a visual or audible indication of proximity or penalty information; and
  - a front-mounted camera that can record images of any rider being approached or road situation.

The rear alert indicator 151 could produce a flashing light signal that flashes once a rider enters a drafting zone and that flashes with an intensity or colour pattern that helps a trailing rider keep track of time spent in the drafting zone. For example, it could flash with a different colour or intensity every 5 seconds.

In another embodiment of this invention, the accelerometer may be supplemented with a rider-activated push-button, used as a means to summon help or indicate that help is not required.

In another embodiment of this invention, the user alert module 158 of the front mounted module 150 includes a numeric display that can show the user:
- the decreasing distance in meters as the user gets closer to a leading rider;
- a timer that provides an indication of the time that the user has spent in the lead rider's drafting zone, which can take the form of an elapsed time or a time remaining to pass; and
- other race-dependent data.

Figure 14:
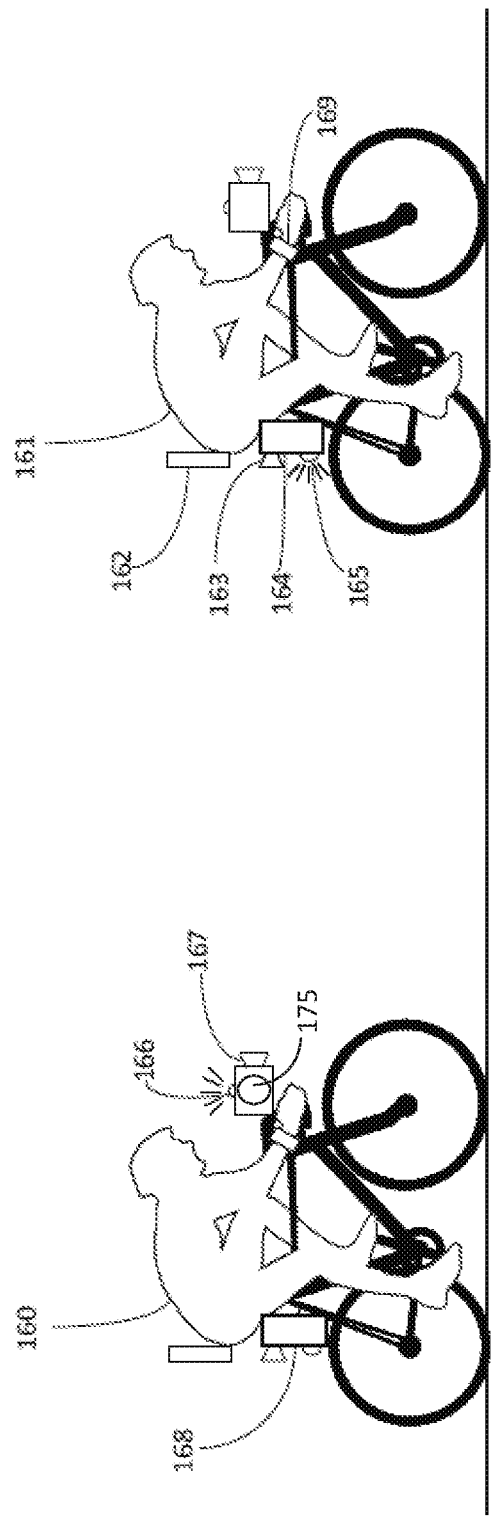
FIG. 14 is a diagram showing how the system of FIG. 13 may be used.

FIG. 14 illustrates how some of these additional features may be used in a race. A rider 160 has entered the drafting zone of a leading rider 161. The proximity monitor 164 of the leading rider 161 has determined that the trailing rider 160 is within the drafting zone and has activated its illuminated rear-facing indicator 165. It has also activated its rear-facing camera 163 to record an image of the trailing rider 160. The proximity monitor 164 also communicates the spacing information to the trailing rider's proximity monitor 168. This in turn activates an audio alarm 175 and/or an illuminated front-mounted indicator 166 in case the trailing rider 160 has not seen the rear-facing indicator 165. The proximity monitor 168 also activates the front-mounted camera 167, which records images of the leading rider 161, including their race ID number 162 and the surrounding road situation. These images may be accessed after the race as evidence should a protest be raised. The images may also be offered for sale to competitors or supporters during or after the race.

The referee may also issue a caution to the trailing rider 160. A caution may be issued due to the trailing rider being in the warning zone discussed with respect to FIG. 4, i.e. could be equivalent to the warning discussed previously, or could be issued for other reasons.

Once issued, a penalty or caution can be transmitted to a penalty enforcement system. For example, the penalty or caution can be transmitted to the penalty monitor 112, and/or to the sign(s) 108, 114 of the penalty enforcement system of FIG. 10A or 10B.

In one variation on this embodiment, the proximity monitor 164 of the leading rider determines a potential drafting event when the trailing rider 160 enters their drafting zone. The proximity monitor 164 then transmits spacing and/or GPS position information to a remote device to determine whether a penalty should be applied. A referee operating the remote device determines to apply a penalty or a caution and the remote device transmits a message to the proximity monitor 168 of the trailing rider 160. The audio alarm 175 and/or illuminated front-mounted indicator 166 are then activated. Any of the data accumulated during the race, including positions, images, passing events or other telemetry data may be used to identify areas of the course associated with a high number of penalties, so that non-penalty zones may be applied to these areas in future races, or so that the course may be redesigned for future races.

While penalties and cautions have been discussed in the context of drafting, they may also be issued for other offences such as littering, outside assistance, and crossing a center line.

In a further embodiment of the invention, the rider may also wear a wrist-mounted tracking device 169 that includes a GPS receiver and an indicator, and that can communicate with a proximity monitor or proximity detector using an RF transceiver. This RF transceiver may be a Bluetooth transceiver or a UWB transceiver which will enable the tracking device to also communicate with other fixed or mobile UWB transceivers, so that if the race involves stages such as running or swimming, the wearer of the device 169 can still be tracked by a race communication system. The tracking device 169 may also incorporate a cellphone data transceiver so that it can communicate with the race communication system if the tracking device 169 is in range of a mobile phone network. The indicator on the tracking device 169 may be an audio indicator, a visual indicator, may generate some detectable haptic vibration or may provide any combination of these indication signals. The indicator can indicate information to a wearer such as cautions, penalty information, or any other race-based information.

Figure 15:
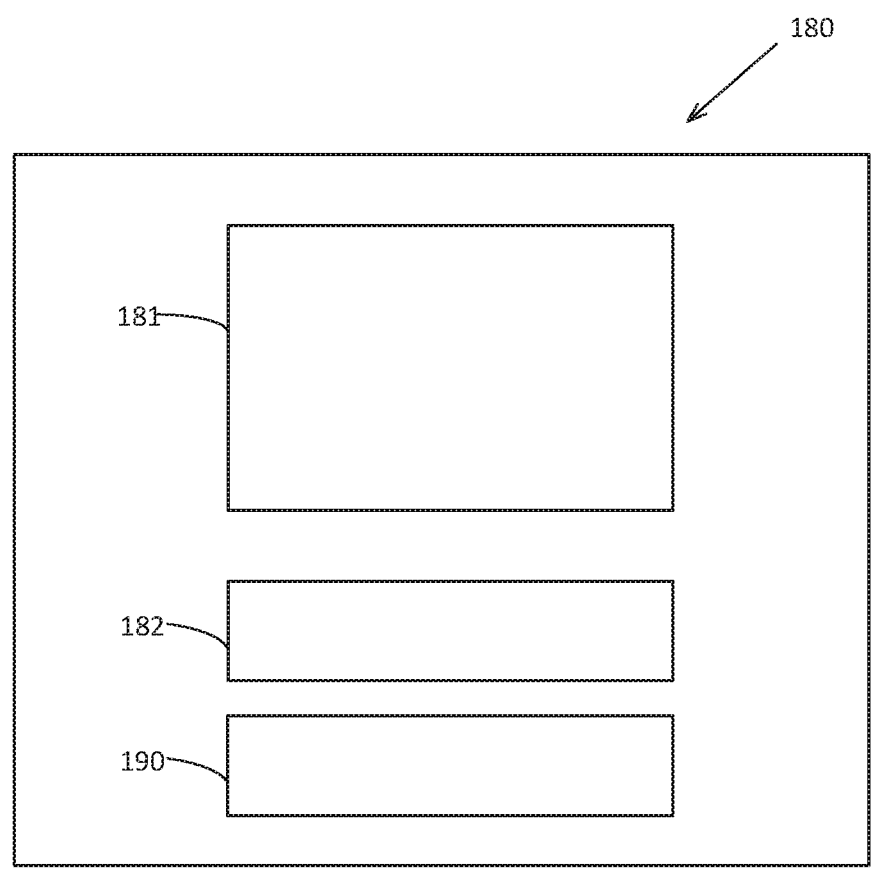
FIG. 15 is a block diagram of an example remote device that may be used by a referee.

FIG. 15 shows one example of a monitoring device 180 that could be carried by a referee. The monitoring device 180 includes a communications modules 182 and 190 and a user interface 181. The communications module 182 may be configured for long range communications with proximity monitors, beacons, penalty systems and other devices. In one example, the communications module 182 is a LoRa or LoRaWAN module. The communications module 190 may be configured for communications with a wide area network. In one example, the communications module 190 is a cellular communications module. The user interface is configured to present information to, and receive inputs from, a user such as a referee. The user interface 181 could include one or more of a display screen, a speaker, or another visual display such as one or more indicator lights for presenting information to a user. The user interface 181 could include one or more of a touch screen, a mouse or trackpad, a keyboard or one or more other buttons for receiving user inputs. In one example, the monitoring device is a general-purpose computing device. In one example, the monitoring device is a tablet computer.

In conclusion, the advantages of these devices, systems and methods are:
- UWB is less subject to interference than GPS only or line of sight based solutions;
- UWB allows accurate non-line of sight measurement;
- A combination of GPS and UWB provides accurate spacing and ordering information to both competitors and referees;
- Communication between devices allows operation even if GPS or communication to the cloud is lost;
- UWB communication rather than a traditional 'sensor' ensures that what is detected is actually another competitor;
- The methods do not significantly deviate from how drafting is measured and enforced currently. In other words, riders receive, and are informed of, a penalty and they may serve it on the side of the course.
- A rear facing indicator light allows rider to keep eyes forward rather than continuously looking down to check their onboard indicator light.
- On course referees may not be required in some applications or may remain, supplemented by the automated system, to retain a human element in drafting determination.
- Images allow real-time or post-race scrutiny of the situation.

UWB triangulation (or other pass detection) allows the determination of the moment in time at which a pass is completed, allowing accurate measurement of drafting events.

Bluetooth mesh technology allows for a large ad-hoc network to form amongst nearby riders.

LoRa or similar output to a referee means the referee can 'watch' and scrutinise riders from afar, which may reduce drafting or other rule infringements.

Exemplary Embodiments

A proximity monitor comprising:
a. a first RF transmitter configured to periodically communicate data with proximate RF receivers;
b. a first RF receiver configured to acquire signal timing information from signals transmitted by proximate RF transmitters;
c. a GPS receiver for determining GPS position information;
d. a processor configured to:
 i. receive the GPS position information and signal timing information;
 ii. develop spacing information as to the spacing between proximate transmitter and receiver pairs based on the signal timing information,
 iii. provide the GPS position information and spacing information to the first RF transmitter or a second RF transmitter to communicate with proximate receivers,
 iv. receive GPS position information and spacing information received by the first RF receiver or a second RF receiver from proximate transmitters; and
 v. develop an alert signal if the GPS position and spacing information satisfies an alert criterion.

A proximity monitor as set out in the preceding exemplary embodiment wherein the first RF transmitters and receivers are UWB transmitters and receivers.

A proximity monitor as set out in the preceding exemplary embodiments, wherein the GPS position information is provided to the second RF transmitter and received by the second RF receiver and wherein the second RF transmitter is a Bluetooth transmitter and the second RF receiver is a Bluetooth receiver.

A proximity monitor as set out in the preceding exemplary embodiments, including a rearwardly facing visual indicator which is activated when the alert condition is satisfied.

A proximity monitor as set out in the preceding exemplary embodiments, comprising a long-range communications module.

A proximity monitor as set out in the preceding exemplary embodiments, configured to transmit the alert signal to a remote device using the long-range communications module.

A proximity monitor as set out in the preceding exemplary embodiments, configured to receive a penalty signal from the remote device using the long-range communications module.

A proximity monitor as set out in the preceding exemplary embodiments, including a user indicator to indicate that the penalty signal has been received.

A proximity monitor as set out in the preceding exemplary embodiments including a user indicator to indicate that the alert signal has been generated.

A proximity monitor as set out in the preceding exemplary embodiments wherein the GPS position information is used to generate information about the ordering of proximity monitor devices along a race course.

A proximity monitor as set out in the preceding exemplary embodiments wherein the GPS position information is used to determine whether the proximity monitor is travelling at a speed at which the processor should develop the alert signal.

A proximity monitor as set out in the preceding exemplary embodiments wherein the GPS position information is used to determine whether the proximity monitor is in a zone in which the processor should develop the alert signal.

A proximity monitor as set out in the preceding exemplary embodiments wherein the period of time that the spacing between proximity monitors has remained within a defined range is also used by the processor to develop the alert signal.

A proximity monitor as set out in the preceding exemplary embodiments wherein the GPS position information is used to determine whether the proximity monitor device has entered a defined penalty serving area.

A proximity monitor as set out in the preceding exemplary embodiments, wherein the processor is further configured to:
 determine that the proximity monitor has incurred a penalty; and
 activate a user indicator to indicate that the penalty is active until the penalty has been completed.

A proximity monitor as set out in the preceding exemplary embodiments including a pair of RF receivers spaced apart from one another wherein the processor determines the bearing of a transmitter with respect to the proximity monitor using triangulation.

A proximity monitor having a front and rear to be aligned with the front and rear of a vehicle in use, the vehicle associated with a monitored zone toward the rear of the vehicle, the proximity monitor comprising:
 a first RF transmitter configured to periodically communicate data with one or more proximate RF receivers of a proximate vehicle in the monitored zone;
 a first RF receiver configured to acquire signal timing information from signals transmitted by one or more proximate RF transmitters of the proximate vehicle;
 a processor configured to:
  develop spacing information as to the spacing between the vehicle and the proximate vehicle;
  develop an alert signal if the spacing information satisfies an alert criterion; and
  provide the alert signal to the first RF transmitter or another RF transmitter.

A proximity monitor as set out in the preceding exemplary embodiment, further comprising a GPS receiver to determine position information.

A proximity monitor as set out in the preceding exemplary embodiments, wherein the processor is configured to compare the position information determined using the GPS receiver to position information associated with the proximate vehicle.

A proximity monitor as set out in the preceding exemplary embodiments, wherein developing an alert signal comprises developing the alert signal if the spacing information and the position information satisfy the alert criterion.

A proximity monitor as set out in the preceding exemplary embodiments, further comprising a second RF receiver spaced apart from the first RF receiver, wherein the processor is configured to determine the bearing of the one or more proximate transmitters using triangulation.

A proximity monitor as set out in the preceding exemplary embodiments, wherein developing an alert signal comprises developing the alert signal if the spacing information and the bearing information satisfy the alert criterion.

A proximity monitor as set out in the preceding exemplary embodiments, wherein the alert criterion comprises whether the proximate vehicle has been in the monitored zone for greater than a defined amount of time.

A proximity monitor as set out in any the preceding exemplary embodiments wherein the first RF transmitter is, or each of the first and second RF transmitters is, a UWB transmitter, and wherein the first RF receiver is a UWB receiver.

A proximity monitor as set out in the preceding exemplary embodiments, comprising a long-range communications transmitter for communicating the alert signal to a remote device.

A proximity monitor as set out in the preceding exemplary embodiments, wherein the long-range communications transmitter is a LoRa or LoRaWAN transmitter.

A proximity monitor as set out in the preceding exemplary embodiments, further comprising a long-range RF receiver for receiving a penalty signal from a remote device.

A proximity monitor as set out in the preceding exemplary embodiments, wherein the long-range RF receiver is a LoRa or LoRaWAN receiver.

A proximity monitor as set out in the preceding exemplary embodiments, further comprising a user indicator configured to indicate when a penalty signal is received.

A proximity monitor as set out in the preceding exemplary embodiments, wherein the user indicator is configured to generate an audible signal.

A proximity monitor as set out in the preceding exemplary embodiments, wherein the user indicator is configured to generate a visual indicator.

A proximity monitor as set out in the preceding exemplary embodiments, wherein the visual indicator is a light configured to be visible to an operator of the vehicle.

A proximity monitor as set out in the preceding exemplary embodiments, further comprising a Bluetooth communications module.

A proximity monitor as set out in the preceding exemplary embodiments configured to transmit and receive position information using the Bluetooth communications module.

A proximity monitor comprising:
a. a RF transmitter configured to periodically communicate with one or more proximate RF receivers;
b. a RF receiver configured to acquire signal timing information from signals transmitted by one or more proximate transmitters; and
c. a processor configured to:
  i. develop spacing information as to the spacing between proximate transmitter and receiver pairs using the signal timing information, and
  ii. develop an alert signal if the spacing information satisfies an alert criterion.

A proximity monitor as set out in the preceding exemplary embodiments wherein the RF transmitters and receivers are UWB transmitters and receivers.

A proximity monitor as set out in the preceding exemplary embodiments, including a rearwardly facing visual indicator which is activated when a proximity monitor of a following vehicle satisfies an alert condition.

A proximity monitor as set out in the preceding exemplary embodiments wherein the alert condition is based on a period of time that the spacing between proximity monitors has remained within a defined range.

A proximity monitor as set out in the preceding exemplary embodiments including a pair of RF receivers spaced apart from one another wherein the processor determines the orientation of the monitor with respect to a proximate transmitter using triangulation.

A proximity monitor as set out in the preceding exemplary embodiments, wherein the signal timing information from three or more proximate transmitters is used to develop information as to the spacing between the receiver and the three or more transmitters.

A proximity monitor having a front and rear to be aligned with the front and rear of a vehicle in use, comprising:
a. a proximity detector for detecting the proximity of a second proximity monitor; and
b. a processor for generating an alert signal when a proximity based criteria is satisfied; and
c. a light driven when the alert signal is generated oriented to project light from the rear of the detector.

A proximity monitor as set out in the preceding exemplary embodiments wherein the alert signal is generated based on the proximity of a following proximity monitor.

A proximity monitor as set out in the preceding exemplary embodiments wherein the proximity detector is a proximity monitor as set out in the preceding exemplary embodiments.

A passing detector comprising:
a housing configured for mounting to a vehicle;
a first RF receiver within the housing and configured to receive signals from a proximate RF transmitter;
a second RF receiver within the housing or within a second housing configured for mounting to the vehicle, the second RF receiver configured to receive signals from the proximate RF transmitter;
a processor configured to:
  determine the bearing of the proximate RF transmitter by triangulation; and
  detect when the proximate RF transmitter has passed the vehicle based on the bearing.

A passing detector as set out in the preceding exemplary embodiment, further comprising a GPS receiver configured to determine position information.

A passing detector as set out in the preceding exemplary embodiments, wherein the processor is configured to detect the RF transmitter passing the vehicle based on the bearing and the position information.

A passing detector as set out in the preceding exemplary embodiments, wherein the first and/or second RF receivers are configured to acquire signal timing information from one or more signals transmitted by the proximate RF transmitter and wherein the processor is configured to develop spacing information as to the spacing between the vehicle and the proximate RF transmitter using the signal timing information.

A passing detector as set out in the preceding exemplary embodiments, wherein the processor is configured to develop an alert signal if the spacing satisfies a predetermined criterion.

A passing detector as set out in the preceding exemplary embodiments, wherein the predetermined criterion comprises the spacing being within a defined range.

A passing detector as set out in the preceding exemplary embodiments, wherein the predetermined criterion comprises the bearing being within a defined range.

A passing detector as set out in the preceding exemplary embodiments, wherein the predetermined criterion comprises whether the RF transmitter has passed the vehicle or not.

A passing detector as set out in the preceding exemplary embodiments, wherein the processor is configured to determine the amount of time spent by the proximate RF transmitter in a defined zone associated with the vehicle.

A passing detector comprising:
  a. a housing for mounting to a vehicle;
  b. a GPS receiver for obtaining GPS position information;
  c. one or more lights generating lateral beams from the sides;
  d. one or more detectors which detect the presence of light incident on the sides and generate a detection signal when specified characteristics of incident light are detected; and
  e. a processor configured to:
    i. receive the GPS position information;
    ii. receive the detection signal; and
    iii. generate an alert signal.

A passing detector as set out in the preceding exemplary embodiment wherein the passing alert signal is generated if the GPS position information and the detection signal timing satisfies alert criteria.

A passing detector as set out in the preceding exemplary embodiments wherein the processor is also configured to provide GPS, detection and alert information to a transceiver to transmit to proximate receivers.

A passing detector as set out in the preceding exemplary embodiments wherein the processor is also configured to receive GPS position information and spacing information received by the transceiver from proximate transmitters.

A passing detector as set out in the preceding exemplary embodiments wherein the GPS position information is used to generate information about the ordering of passing detector devices along a race course.

A passing detector as set out in the preceding exemplary embodiments wherein the GPS position information is used to determine whether the detector function of the passing detector device is enabled or disabled.

A passing detector as set out in the preceding exemplary embodiments wherein the GPS position information is used to determine whether the proximity monitor is travelling at a speed at which whether the detector function of the passing detector device is enabled or disabled.

A passing detector as set out in the preceding exemplary embodiments wherein the GPS position information is used to determine whether the passing detector device has entered a pre-defined penalty zone.

A passing detector as set out in the preceding exemplary embodiments including:
  a. a housing having a front and rear to be aligned with the front and rear of a vehicle in use; and
  b. a light driven when an alert signal is generated directed to project light from the rear of the detector.

A proximity monitor or passing detector as set out in the preceding exemplary embodiments wherein the alert signal also generates an audio signal.

A proximity monitor or passing detector as set out in in the preceding exemplary embodiments which also includes a front-facing camera.

A proximity monitor or passing detector as set out in the preceding exemplary embodiments which also includes a rear-facing camera.

A proximity monitor or passing detector as set out in the preceding exemplary embodiments which also includes an impact detector and a means of communicating impact events.

A proximity monitor or passing detector as set out in the preceding exemplary embodiments which also includes a wireless charging system.

A proximity monitor or passing detector as set out in the preceding exemplary embodiments which also includes a means of communicating with biometric or other telemetry devices.

A method of determining the relative positions of a first and second vehicle, each having a RF transceiver and a GPS receiver comprising:
  a. determining the positions of vehicles based on GPS signals received by each GPS receiver;
  b. determining the spacing between the vehicles based on the timing of signals between transceivers; and
  c. developing an alert signal if position and spacing information satisfies an alert criterion.

A method of determining the relative positions of a first and second vehicle as set out in the preceding exemplary embodiments, wherein the spacing between the vehicles is determined based on the timing of signals between 3 or more transceivers.

A method of determining the relative positions of a first and second vehicle as set out in the preceding exemplary embodiments, wherein historical spacing data and historical GPS data is used to determine the relative positions of the first and second vehicle.

A method of determining the relative positions of a first and second vehicle as set out in the preceding exemplary embodiments, wherein the RF transceiver and the GPS receiver are included in a proximity monitor as set out in the preceding exemplary embodiments.

A vehicle ordering method to be used between two race vehicles wherein each vehicle includes:
  a. front-mounted forward facing optical detector; and
  b. a rear-mounted and rear-facing optical transmitter,
    whereby the rear-facing optical transmitter transmits a beam that identifies the race vehicle associated with the optical transmitter, and whereby the leading race vehicle transmits its identifying code to the detector of the trailing race vehicle, which the front-mounted detector detects when it is within a beam transmitted rearwardly by the rear-facing optical transmitter.

A vehicle ordering method as set out in the preceding exemplary embodiment wherein the rear-facing optical transmitter transmits light which is spectrally and/or spatially and/or temporally modulated.

A vehicle ordering method as set out in the preceding exemplary embodiments, wherein each race vehicle includes a proximity monitor as set out in the preceding exemplary embodiments, or a passing detector as set out in the preceding exemplary embodiments.

A method of indicating a rules infraction between two vehicles by producing a visual signal from the rear of a leading vehicle when a rules infraction between the two vehicles is detected.

A method of indicating a rules infraction between two vehicles as set out in the preceding exemplary embodiment using a proximity monitor as set out in the preceding exemplary embodiments, or a passing detector as set out in the preceding exemplary embodiments.

A race communication system comprising:
  a plurality of race vehicles, each vehicle including one or more RF transceivers and a user indicator; and
  one or more remote devices, each including an RF transceiver and a user interface;
  wherein the one or more RF transceivers of each vehicle are configured to:

communicate with an RF transceiver of a proximate vehicle in a monitored zone associated the vehicle;
determine spacing information as to the spacing between the vehicle and the proximate vehicle based on the communications;
transmit a signal to the remote device based on the spacing between the vehicle and the proximate vehicle;
and wherein the remote device is configured to:
receive the signal from the vehicle using the RF transceiver,
present information based on the spacing between the vehicle and the proximate vehicle to a user using the user interface;
receive an input from the user using the user interface;
develop a penalty signal based on the input from the user; and
transmit the penalty signal to the proximate vehicle using the RF transceiver.

A race communication system as set out in the preceding exemplary embodiment, wherein each of the race vehicles includes a camera, and wherein each of the race vehicles is configured to transmit visual images recorded by the camera to the remote device.

A race communication system as set out in the preceding exemplary embodiments, wherein each vehicle is configured to transmit the signal to the remote device indirectly via one or more other RF transceivers.

A race communication system comprising:
a. a plurality of race vehicles, each including an RF transceiver;
b. at least one fixed RF transceiver, located at a known location around the race course;
c. a central computing device; and
d. a display device,
wherein each RF transceiver is configured to:
i. communicate with other RF transceivers;
ii. communicate location information between other RF transceivers;
iii. communicate with the central computing device either directly or via at least one other RF transceiver; and
iv. communicate penalty information between other RF transceivers.

A race communication system as set out in the preceding exemplary embodiment wherein the at least one fixed RF transceiver is also configured to determine race vehicle locations using triangulation between two fixed RF transceivers and one race vehicle-mounted RF transceiver.

A race communication system as set out in the preceding exemplary embodiments wherein the central computing device monitors information from the plurality of race vehicles and checks this information against race-based rules.

A race communication system as set out in the preceding exemplary embodiments wherein the computing device provides information from the plurality of vehicles and other race-based information to the display device.

A race communication system as set out in the preceding exemplary embodiments wherein the race vehicle RF transceivers are included in proximity monitors as set out in the preceding exemplary embodiments.

A pass detecting system comprising:
a. a plurality of position detectors, each including:
i. a housing for mounting to a vehicle;
ii. a GPS receiver for obtaining GPS position information;
iii. one or more light generating lateral beams from the sides; and
iv. one or more detectors which detect the presence of light incident on the sides and generates a detection signal when specified characteristics of incident light are detected; and
b. a central computer in communication with the position detectors which receives the GPS position information and detection signals from at least some of the position detectors and develops an alert signal if GPS position information and detection signal timing satisfies alert criteria.

A pass detection system as set out in the preceding exemplary embodiment, wherein the plurality of position detectors are passing detectors as set out in the preceding exemplary embodiments.

An on-course penalty enforcement system, comprising:
a. a race communication system;
b. a penalty alerting device; and
c. a plurality of penalty detection devices,
wherein the plurality of penalty detection devices are configured to detect a rule infraction and communicate via the race communication system to the penalty alerting device, and wherein the penalty alerting device is configured to display a penalty alert to a user.

A system as set out in the preceding exemplary embodiments wherein the race communication system is a race communication system as set out in the preceding exemplary embodiments.

A system as set out in the preceding exemplary embodiments wherein the plurality of penalty detection devices are proximity monitors as set out in the preceding exemplary embodiments or passing detectors as set out in the preceding exemplary embodiments.

A system as set out in the preceding exemplary embodiments wherein the penalty alerting device is a proximity monitor as set out in the preceding exemplary embodiments or a passing detector as set out in the preceding exemplary embodiments.

A system as set out in the preceding exemplary embodiments wherein the penalty alerting device is a visual display device that is configured to output to or communicate with the race communication system.

A method of enforcing an on-course penalty via a penalty alerting device comprising:
a. detecting a rules infraction;
b. indicating the rules infraction to a user by notification via the penalty alerting device;
c. monitoring the position of the user;
d. determining when the user has satisfied a penalty condition; and
e. indicating the termination of the penalty to a user.

A method of enforcing an on-course penalty as set out in the preceding exemplary embodiment wherein indicating the termination of the penalty to a user consists of maintaining the notification until a prescribed penalty has been performed.

A method of enforcing an on-course penalty as set out in the preceding exemplary embodiments wherein indicating the termination of the penalty to a user consists of providing a second notification, different to the first, after a prescribed penalty has been performed.

A method of enforcing an on-course penalty as set out in the preceding exemplary embodiments wherein the penalty requires that the user remain within a geographical area for a prescribed time.

A method of enforcing an on-course penalty as set out in the preceding exemplary embodiments wherein the penalty requires that the user reduce their speed below a prescribed limit for a prescribed time.

A method of enforcing an on-course penalty as set out in the preceding exemplary embodiments wherein the penalty requires that the user remains stationary for a prescribed time.

A method of enforcing an on-course penalty as set out in the preceding exemplary embodiments wherein the penalty requires that the user maintains a prescribed separation from a leading vehicle for a prescribed time.

A method of enforcing an on-course penalty as set out in the preceding exemplary embodiments used with a system as set out in the preceding exemplary embodiments.

A tracking device, configured to be temporarily attached to a wrist of a user, including:
an RF transceiver;
an indicator; and
a GPS receiver module generating a GPS position signal,
wherein the RF transceiver is configured to communicate with a proximity monitor as set out in the preceding exemplary embodiments.

A tracking device as set out in the preceding exemplary embodiment wherein the RF transceiver is a Bluetooth transceiver.

A tracking device as set out in the preceding exemplary embodiments wherein the RF transceiver is also configured to communicate with other fixed or mobile RF transceivers.

A tracking device as set out in the preceding exemplary embodiments wherein the RF transceiver is a UWB transceiver.

A tracking device as set out in the preceding exemplary embodiments, also including a cellphone data transceiver, configured to communicate with a mobile phone network.

A tracking device as set out in the preceding exemplary embodiments wherein the tracking device can transmit the GPS position signal to other RF transceivers.

A tracking device as set out the preceding exemplary embodiments wherein the indicator can indicate cautions, penalties, or other race-based information to the user.

A tracking device as set out in the preceding exemplary embodiments wherein the indicator is configured to generate vibrations that can be felt by the user.

A tracking device as set out the preceding exemplary embodiments wherein the indicator is configured to generate a visual indication to the user.

A tracking device as set out in the preceding exemplary embodiments wherein the indicator is configured to generate an audio signal that can be heard by the user.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A proximity monitor for monitoring a zone associated with a vehicle, the proximity monitor comprising:
a first radiofrequency (RF) transmitter configured to communicate data with one or more proximate RF receivers of a proximate vehicle in the monitored zone;
a first RF receiver configured to acquire signal timing information from signals transmitted by one or more proximate RF transmitters of the proximate vehicle;
a long-range communication module configured to receive a penalty signal from a remote device; and
a processor configured to:
generate spacing information as to the spacing between the vehicle and the proximate vehicle;
generate an alert signal based on the penalty signal.

2. A proximity monitor as clamed in claim 1, further comprising a pass detection device configured to detect one of the vehicle and the proximate vehicle passing the other, and wherein generating an alert signal comprises generating the alert signal if a passing detection or non-detection and the spacing information satisfy an alert criterion.

3. A proximity monitor as claimed in claim 1, further comprising a Bluetooth communications module for transmitting and receiving position information.

4. A proximity monitor as claimed in claim 1 wherein the first RF transmitter is, or each of the first and second RF transmitters is, an ultrawideband (UWB) transmitter, and wherein the first RF receiver is a UWB receiver.

5. A proximity monitor as claimed in claim 1, further comprising a user indicator configured to indicate when the penalty signal is received at the proximity monitor.

6. A proximity monitor as claimed in claim 5, wherein the user indicator is configured to generate an audible signal or a visual signal.

7. A proximity monitor as claimed in claim 1, further comprising a visual or audible indicator to indicate to a user of the proximate vehicle when the alert signal has been generated.

8. A proximity monitor as claimed in claim 1, further comprising a camera, and wherein the proximity monitor is configured to transmit an output of the camera to a remote device upon determination of an alert condition.

9. A proximity monitor as claimed in claim 1, wherein the processor is further configured to determine information indicative of an amount of time spent by the proximate vehicle in the monitored zone.

10. A race communication system comprising:
a plurality of vehicles, each vehicle including a proximity monitor for monitoring a zone associated with a vehicle, the proximity monitor comprising:
a first radiofrequency (RF) transmitter configured to communicate data with one or more proximate RF receivers of a proximate vehicle in the monitored zone;
a first RF receiver configured to acquire signal timing information from signals transmitted by one or more proximate RF transmitters of the proximate vehicle;
a processor configured to generate spacing information as to the spacing between the vehicle and the proximate vehicle; and
a user indicator; and
one or more remote devices, each including an RF transceiver and a user interface;
wherein the proximity monitor of each vehicle is configured to:
transmit a signal to the remote device based on the spacing between the vehicle and a proximate vehicle; and wherein the remote device is configured to:

receive the signal from the vehicle using the RF transceiver, present information based on the spacing between the vehicle and the proximate vehicle to a user via the user interface;

receive an input from the user via the user interface;

generate a penalty signal based on the input from the user; and wherein the penalty signal indicates that a penalty is to be applied to the proximate vehicle or a user thereof.

11. A race communication system as claimed in claim 10, wherein each of the vehicles is provided with a camera, and wherein each of the vehicles is configured to transmit visual images recorded by the camera to the remote device.

12. A race communication system as claimed in claim 10, further comprising a user indicator configured to present a visible or audible signal to the proximate vehicle or a user thereof.

13. A race communication system as claimed in clam 10, wherein the remote computer is configured to record an amount of time spent by a vehicle in the monitored zone associated with another vehicle.

14. A race communication system as claimed in claim 10, further comprising a penalty enforcement system, wherein the penalty enforcement system comprises: a communications interface configured to receive the penalty signal from the remote device;

a processor configured to determine whether the proximate vehicle of user thereof has fulfilled requirements of the penalty.

* * * * *